United States Patent
Charantimath et al.

(10) Patent No.: US 12,100,416 B2
(45) Date of Patent: Sep. 24, 2024

(54) RECOMMENDATION OF AUDIO BASED ON VIDEO ANALYSIS USING MACHINE LEARNING

(71) Applicant: SONY GROUP CORPORATION, Tokyo (JP)

(72) Inventors: Kiran Charantimath, Bangalore (IN); Karan Parikh, Bangalore (IN)

(73) Assignee: SONY GROUP CORPORATION, Tokyo (JP)

(*) Notice: Subject to any disclaimer, the term of this patent is extended or adjusted under 35 U.S.C. 154(b) by 589 days.

(21) Appl. No.: 17/370,138

(22) Filed: Jul. 8, 2021

(65) Prior Publication Data

US 2023/0019025 A1   Jan. 19, 2023

(51) Int. Cl.
| | |
|---|---|
| G10L 25/57 | (2013.01) |
| G06F 3/16 | (2006.01) |
| G06F 16/64 | (2019.01) |
| G06F 18/21 | (2023.01) |
| G06F 40/30 | (2020.01) |
| G06T 7/20 | (2017.01) |
| G06T 7/70 | (2017.01) |

(Continued)

(52) U.S. Cl.
CPC .............. *G10L 25/57* (2013.01); *G06F 3/165* (2013.01); *G06F 16/64* (2019.01); *G06F 18/21* (2023.01); *G06F 40/30* (2020.01); *G06T 7/20* (2013.01); *G06T 7/70* (2017.01); *G06V 20/41* (2022.01); *G10L 25/30* (2013.01); *G10L 25/54* (2013.01); *G06T 2207/10016* (2013.01)

(58) Field of Classification Search
CPC ......... G10L 25/57; G10L 25/30; G10L 25/54; G06T 7/70; G06T 7/20; G06F 16/64; G06F 18/21; G06F 3/165; G06V 20/41
See application file for complete search history.

(56) References Cited

U.S. PATENT DOCUMENTS

| | | | |
|---|---|---|---|
| 6,704,421 B1* | 3/2004 | Kitamura | H03G 5/005 |
| | | | 381/103 |
| 9,031,243 B2 | 5/2015 | Leboeuf et al. | |

(Continued)

FOREIGN PATENT DOCUMENTS

CN    111681678 A    9/2020

OTHER PUBLICATIONS

Adam Conner-Simons, "Artificial intelligence produces realistic sounds that fool humans", Massachusetts Institute of Technology, Jun. 13, 2016, 04 pages.

*Primary Examiner* — Kevin Ky
(74) *Attorney, Agent, or Firm* — CHIP LAW GROUP

(57) ABSTRACT

An electronic device and method for recommendation of audio based on video analysis is provided. The electronic device receives one or more frames of a first scene of a plurality of scenes of a video. The first scene includes a set of objects. The electronic device applies a trained neural network model on the received one or more frames to detect the set of objects. The electronic device determines an impact score of each object of the detected set of objects of the first scene based on the application of the trained neural network model on the set of objects. The electronic device further selects at least one first object from the set of objects based on the impact score of each object, and recommends one or more first audio tracks as a sound effect for the first scene based on the selected at least one first object.

18 Claims, 11 Drawing Sheets

(51) Int. Cl.
  *G06V 20/40*      (2022.01)
  *G10L 25/30*      (2013.01)
  *G10L 25/54*      (2013.01)

(56) References Cited

U.S. PATENT DOCUMENTS

| | | | | |
|---|---|---|---|---|
| 10,268,759 | B1* | 4/2019 | Witt | G06F 16/4393 |
| 10,998,006 | B1* | 5/2021 | Oliva | H04S 7/30 |
| 11,282,509 | B1* | 3/2022 | Li | G06F 16/65 |
| 11,354,900 | B1* | 6/2022 | Li | G06V 10/56 |
| 2010/0004926 | A1* | 1/2010 | Neoran | G10L 25/48 |
| | | | | 704/201 |
| 2013/0246919 | A1* | 9/2013 | Oh | H04N 21/4122 |
| | | | | 715/719 |
| 2014/0142958 | A1* | 5/2014 | Sharma | G10L 19/018 |
| | | | | 704/500 |
| 2017/0193337 | A1* | 7/2017 | Kriegman | G06F 18/254 |
| 2020/0020322 | A1* | 1/2020 | Guevara | G06N 3/08 |
| 2020/0090701 | A1* | 3/2020 | Xu | H04N 21/2743 |
| 2020/0134456 | A1* | 4/2020 | Li | H04N 21/4662 |
| 2021/0134009 | A1* | 5/2021 | Zhang | G06V 40/166 |
| 2021/0174817 | A1* | 6/2021 | Grauman | G10L 25/51 |
| 2022/0086256 | A1* | 3/2022 | Stram | H04L 67/535 |
| 2022/0164407 | A1* | 5/2022 | Sardar | G06N 3/08 |
| 2023/0019025 | A1* | 1/2023 | Charantimath | G11B 27/031 |

* cited by examiner

Computer-Generated Object Script 500

| Time Duration 502 | Object Type 504 | Impact Score 506 |
|---|---|---|
| 0.22-5.22 | Horse | 20 |
| 8.18-9.24 | Bike | 30.32 |
| 9.24-12.28 | Horse | 18.91 |
| 12.29-16.13 | Bike | 28 |
| 16.13-22.04 | Horse | 15 |
| 22.04-26.05 | Bike | 10 |
| 26.05-38.28 | Bike, Horse | 16.32, 22.63 |
| 38.18-41.11 | Gun, Bike, Horse | 18.25, 12.44, 0 |
| 41.11-47.55 | Bike, Horse | 13.33, 26.44 |
| 47.55-49.20 | Gun, Bike, Horse | 6, 34.55, 27.34 |
| 48.33-49.50 | Dash, Bike, Horse | 0, 5, 23 |
| 49.20-58.00 | Horse | 24.56 |

FIG. 5

RECOMMENDATION OF AUDIO BASED ON VIDEO ANALYSIS USING MACHINE LEARNING

CROSS-REFERENCE TO RELATED APPLICATIONS/INCORPORATION BY REFERENCE

None.

FIELD

Various embodiments of the disclosure relate to recommendation of audio based on video analysis. More specifically, various embodiments of the disclosure relate to an electronic device and a method for recommendation of audio based on video analysis.

BACKGROUND

Recent advancements in the field of media content production have led to development of various techniques to enhance viewing experience of the media content. Typically, the media content (for example, a video) may include different portions, such as, a video track and an audio track that may be rendered concurrently on a media rendering device. The audio track may include dialogues spoken by one or more characters in the media content. In certain situations, the audio track may include one or more sound effects (such as footsteps, doors opening and closing, wind blowing, glass breaking, and other ambient noise) that are added to the media content during post-production to enhance the auditory experience of the media content. Traditionally, a sound editor may add these sound effects to the media content by manual scene-by-scene analysis of the media content for detection of one or more objects in each scene. Based on the detection, the sound editor may add the sound effects associated with the detected objects during the post-production. In some scenarios, these sound effects are manually generated by sound effect professionals (such as Foley artists). Accordingly, traditional techniques for creation and addition of the sound effects to the media content may be cumbersome, time-consuming, and subject to resource constraints.

Furthermore, existing techniques may not reuse sound effects previously used in other media content due to lack of proper classification of audio. Existing techniques for audio classification may involve manual input and may be time-consuming, while the resulting classification of audio may differ from one technique to another.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for recommendation of audio based on video analysis is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 5 is a diagram that illustrates a portion of a computer-generated object script associated with a video, in accordance with an embodiment of the disclosure.

DETAILED DESCRIPTION

Figure 1:
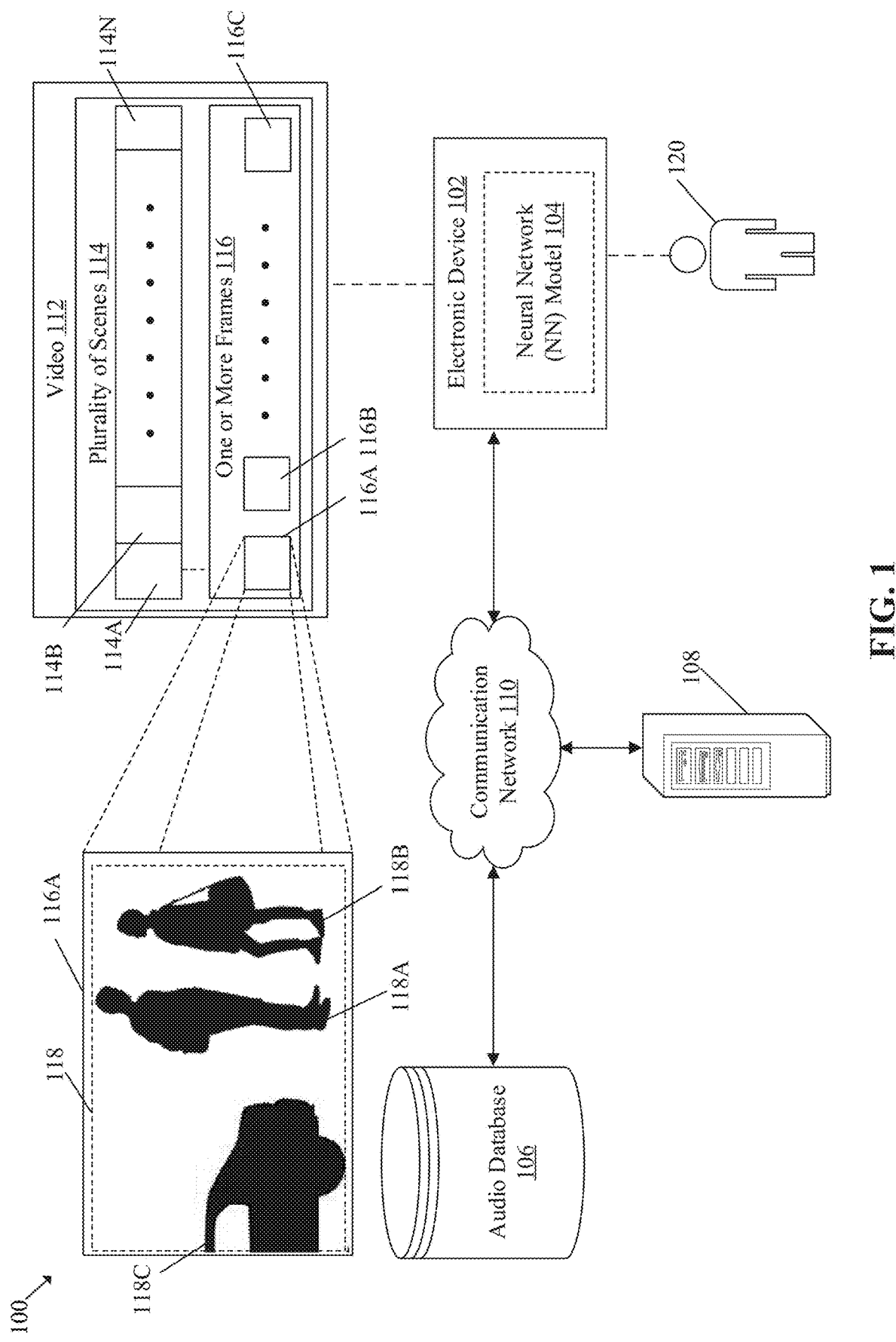
FIG. 1 is a block diagram that illustrates an exemplary network environment for recommendation of audio based on video analysis, in accordance with an embodiment of the disclosure.

The following described implementations may be found in the disclosed electronic device and method for recommendation of audio based on video analysis. Exemplary aspects of the disclosure provide an electronic device (for example, a computing device) that may be configured to receive one or more frames of a first scene of a plurality of scenes of a video (for example, a movie). The first scene may include a set of objects (for example, a human, a vehicle). The electronic device may apply a trained neural network model on the received one or more frames of the first scene to detect the set of objects. The electronic device may determine an impact score of each object of the detected set of objects of the first scene based on the application of the trained neural network model on the set of objects. The impact score may indicate a weight associated with a respective object among the set of objects of the first scene. The electronic device may further select at least one first object (for example, a human or a vehicle) from the set of objects based on the impact score of each object of the detected set of objects. The electronic device may further recommend one or more audio tracks (for example, Foley sounds, ambient sounds, or background music from an audio database) as a sound effect for the first scene based on the selected at least one first object. The electronic device may thereby improve recommendation and addition of sound effects to the video by neural network-based recommendation of audio tracks to a sound editor from an audio database that stores a plurality of audio tracks.

In another embodiment, the electronic device may generate a computer-generated object script based on a plurality of impact scores for each scene of the plurality of scenes. The computer-generated object script may include a time duration of an appearance of each object of the set of objects in the video, and a type of the respective object. Based on the computer-generated object script, the electronic device may recommend the one or more audio tracks as the sound effect for the first scene based on a highest impact score of the at least one first object among the plurality of impact scores.

In another embodiment, the electronic device may determine a set of key points associated with a posture of the first object (for example, a human) of the set of objects. The electronic device may further determine a first set of coordinate values associated with the set of key points at a first timestamp and a second set of coordinate values associated with the set of key points at a second timestamp. The electronic device may detect a motion of the at least one first object based on the determined first set of coordinate values and the second set of coordinate values, and may recommend the one or more audio tracks as the sound effect for the first scene based on the detected motion of the at least one first object.

In another embodiment, the electronic device may classify the plurality of audio tracks into one or more categories based on a set of parameters associated with a corresponding audio track of the plurality of audio tracks, and may store the classified plurality of audio tracks in the audio database for recommendation.

In another embodiment, the electronic device may train a neural network model on one or more features related to the set of objects to obtain the trained neural network model. The electronic device may train and employ the neural network model for the classification of the one or more first audio tracks in the audio database, the detection of the set of objects in the video, the determination of the impact score of each object of the set of objects, and the recommendation of the one or more audio tracks. The electronic device may thereby automate tasks of the classification of the plurality of audio tracks, the analysis of the video, mapping of one or more audio tracks to the video, and the recommendation of the one or more audio tracks based on the impact score, thereby reducing manual effort and time, and eliminating resource constraints. The application of the neural network ensures uniform classification of the audio tracks thereby allowing reuse of the audio tracks as sound effects.

FIG. 1 is a block diagram that illustrates an exemplary network environment for recommendation of audio based on video analysis, in accordance with an embodiment of the disclosure. With reference to FIG. 1, there is shown a network environment 100. In the network environment 100, there is shown an electronic device 102, an audio database 106, a server 108, and a communication network 110. The electronic device 102 may include a neural network (NN) model 104. The electronic device 102 may be communicatively coupled to the audio database 106 and the server 108, via the communication network 110. The electronic device 102 may be associated with a user 120. For example, the user 120 may be a sound editor, a sound engineer, a sound mixer, an editor of the video 112, a writer, or an actor, or a director of the video 112.

With reference to FIG. 1, there is further shown a video 112 that may include a plurality of scenes 114. The plurality of scenes 114 may include a first scene 114A, a second scene 114B, up to an Nth scene 114N. Each of the plurality of scenes 114 may include one or more frames. With reference to FIG.1, there is shown one or more frames 116 that may be associated with the first scene 114A. The one or more frames 116 may include a first frame 116A, a second frame 116B, up to an Nth frame 116N. The first frame 116A may include a set of objects 118 that may include a first object 118A (such as a human), a second object 118B, and a third object 118C (such as a vehicle).

Further in FIG. 1, although the NN model 104 is shown integrated with the electronic device 102, the disclosure is not so limited. In some embodiments, the NN model 104 may be separated from the electronic device 102, without deviating from scope of the disclosure. In some embodiments, the audio database 106 may be stored within the electronic device 102, without deviating from scope of the disclosure.

The electronic device 102 may comprise suitable logic, circuitry, interfaces, and or code that may be configured to receive the one or more frames 116 of the first scene 114A of the plurality of scenes 114 of the video 112 from a remote source (such as the server 108) or from a memory (i.e. memory 204 in FIG. 2) of the electronic device 102. The electronic device 102 may be configured to apply the NN model 104 on the received one or more frames 116, and may recommend one or more first audio tracks as a sound effect for the first scene 114A based on the application of the NN model 104 on the received one or more frames 116. Examples of the electronic device 102 may include, but are not limited to, a computing device, a computer workstation, a mainframe computer, a handheld computer, a smartphone, a cellular phone, a mobile phone, a gaming device, a server, and/or other computing device with media processing (such as video analysis), media editing (such as audio equalization), and media rendering capability.

The neural network (NN) model 104 (such as a convolutional neural network or a recurrent neural network) may be a machine learning model, and may be defined by its hyper-parameters, for example, activation function(s), number of weights, cost function, regularization function, input size, number of layers, and the like. The NN model 104 may be a computational network or a system of artificial neurons, arranged in a plurality of layers, as nodes. The plurality of layers of the NN model 104 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the NN model 104. Outputs of each hidden layer may be coupled to inputs of at least one node in other layers of the NN model 104. Node(s) in the final layer may receive inputs from at least one hidden layer to output a result. The number of layers and the number of nodes in each layer may be determined from hyper-parameters of the NN model 104. Such hyper-parameters may be set before, while training, or after training the NN model 104 on a training dataset.

Each node of the NN model 104 may correspond to a mathematical function (e.g. a sigmoid function or a rectified linear unit) with a set of parameters, tunable during training of the NN model 104. The set of parameters may include, for example, a weight parameter, a regularization parameter, and the like. Each node may use the mathematical function to compute an output based on one or more inputs from nodes in other layer(s) (e.g. previous layer(s)) of the NN model 104. All or some of the nodes of the NN model 104 may correspond to the same or a different mathematical function.

In accordance with an embodiment, the electronic device 102 may train the NN model 104 on one or more features related to the one or more frames 116, one or more features related to the set of objects 118, posture and motion associated with the set of objects 118, metadata associated with the one or more first audio tracks, and so on, to obtain the trained NN model 104. The NN model 104 may be trained to classify the plurality of audio tracks in the audio database 106, the detection of the set of objects 118, the determination of the impact score of each object of the set of objects 118. For example, the electronic device 102 may input several frames of the video 112, features associated with the set of objects 118, and the metadata associated with the plurality of tracks in the audio database 106 to the NN model 104 to train the NN model 104. For example, the video 112 may include scenes that include a variety of objects (such as animate objects, inanimate objects, etc.).

In training the NN model 104, one or more parameters of each node of the NN model 104 may be updated based on whether an output of the final layer for a given input (from the training dataset) matches a correct result based on a loss function for the NN model 104. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The NN model 104 may include electronic data, which may be implemented as, for example, a software component of an application executable on the electronic device 102. The NN model 104 may rely on libraries, external scripts, or other logic/instructions for execution by a processing device, such as circuitry. The NN model 104 may include code and routines configured to enable a computing device, such as the electronic device 102 to perform one or more operations for classification of audio tracks, detection of the set of objects 118, and recommendation of the one or more first audio tracks for each of the plurality of scenes 114. Additionally or alternatively, the NN model 104 may be implemented using hardware including a processor, a microprocessor (e.g. to perform or control performance of one or more operations), a field-programmable gate array (FPGA), or an application-specific integrated circuit (ASIC). Alternatively, in some embodiments, the NN model 104 may be implemented using a combination of hardware and software. Examples of the NN model 104 may include, but are not limited to, a deep neural network (DNN), a convolutional neural network (CNN), R-CNN, Fast R-CNN, Faster R-CNN, an artificial neural network (ANN), (You Only Look Once) YOLO network, CNN+ANN, a fully connected neural network, and/or a combination of such networks.

The audio database 106 may include suitable logic, circuitry, and interfaces that may be configured to store a plurality of audio tracks. Each of the plurality of audio tracks may be a sound effect (such as Foley sounds) and/or an ambient sound and/or a background music, and may be associated with one or more objects. The audio database 106 may be implemented, for example, as a relational database with a defined schema or a non-relational database, such as a NoSQL (Structured Query Language) database that supports key-value and document data structures. In an embodiment, the audio database 106 may be a cloud database which may be accessible as-a-service on the electronic device 102. The audio database 106 may further include a classification of the plurality of tracks based on metadata (such as a label indicating a type of object that generates the audio) associated with the plurality of tracks. The plurality of tracks in the audio database 106 may be further classified based on a set of parameters that comprises at least one of a mel-frequency cepstral coefficient (MFCC) parameter, a zero-crossing rate parameter, a spectral-roll off parameter, a spectral bandwidth, a spectral flux parameter, a spectral entropy parameter, a chroma vector parameter, a chroma deviation parameter, an energy parameter, or a pitch parameter. The audio database 106 may further store each track of the plurality of tracks in association with a file format of the corresponding track, a duration of the corresponding track, a label of the type of object associated with or the type of sound of the corresponding track, an impact score (such as a weight) associated with the corresponding track, and so on.

The server 108 may comprise suitable logic, circuitry, interfaces, and code that may be configured to store a plurality of videos. The server 108 may receive a request from the electronic device 102 to retrieve the video 112 stored in the server 108. In some embodiments, the server 108 may store an original script associated with the video 112 (such as the movie) and a computer-generated object script of the first scene 114A of the video 112. In another embodiment, the server 108 may store the audio database 106. In another embodiment, the server 108 may be further configured to train and store the NN model 104. The server 108 may be further configured to generate training data (such as labeled data for object detection and audio classification) for the NN model 104. In an embodiment, the server 108 may be configured to store object detection data for detection of objects in the one or more frames 116 of the video 112. The server 108 may be further configured to transmit the NN model 104 along with the training data and the object detection data to the electronic device 102. The server 108 may be implemented as a cloud server which may execute operations through web applications, cloud applications, HTTP requests, repository operations, file transfer, and the like. Other examples of the server 108 may include, but are not limited to a database server, a file server, a web server, a media server, an application server, a mainframe server, a cloud server, or other types of servers. In one or more embodiments, the server 108 may be implemented as a plurality of distributed cloud-based resources by use of several technologies that are well known to those skilled in the art. A person with ordinary skill in the art will understand that the scope of the disclosure may not be limited to implementation of the server 108 and the electronic device 102 as separate entities. In certain embodiments, the functionalities of the server 108 may be incorporated in its entirety or at least partially in the electronic device 102, without departing from the scope of the disclosure.

The communication network 110 may include a communication medium through which the electronic device 102, the audio database 106, and the server 108 may communicate with each other. The communication network 110 may be a wired or wireless communication network. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

In operation, a production of the video 112 may be completed and post-production of the video 112 may be in progress. During the post-production of the video 112, one or more sound effects (such as Foley sounds or background sounds) may have to be added to enhance the audio experience of the video 112. These sound effects may correspond to audio tracks that may be blended with an original audio track that may include dialogues, natural ambient sounds, and music.

The electronic device 102 may receive a first input for recommendation of one or more audio first tracks for the first scene 114A of the video 112. The first input may include the one or more frames 116 of the first scene 114A of the video 112. In some embodiments, the first input may include the video 112 as a whole. The first scene 114A may include the set of objects 118 such as the first object 118A (such as a human), the second object 118B, and the third object 118C (such as a vehicle).

The electronic device 102 may apply the trained NN model 104 on the received one or more frames 116 of the first scene 114A. The NN model 104 may be trained to detect each object of the set of objects 118 present in the one or more frames 116 of the first scene 114A. The electronic device 102 may further determine the impact score of each object of the detected set of objects 118 of the first scene 114A based on the application of the trained NN model 104 on the set of objects 118. The impact score may indicate a weight associated with a respective object among the set of objects 118 of the first scene 114A. For example, the impact score may indicate an impact that the respective object of the set of objects 118 may have on the first scene 114A of the video 112.

The electronic device 102 may be configured to select at least one first object 118A from the set of objects 118 based on the impact score of each object of the detected set of objects 118. The selected first object 118A may have the highest impact score among the set of objects 118 in the first scene 114A. Based on the selection of the first object 118A, the electronic device 102 may be further configured to recommend one or more first audio tracks as the sound effect for the first scene 114A. The recommended one or more first audio tracks may include at least one of Foley sounds, ambient sounds, or background music from the audio database 106. The electronic device may thereby improve recommendation and addition of sound effects to the video 112 by neural network-based recommendation of the one or more first audio tracks to a sound editor from the audio database 106.

The electronic device 102 may be further configured to select at least one audio track from the recommended one or more first audio tracks and add the selected at least one audio track as the sound effect to an original audio track of the first scene 114A. The original audio track may include one or more dialogues spoken by one or more objects (such as the first object 118A, and the second object 118B) of the set of objects 118.

In another embodiment, the electronic device 102 may generate a computer-generated object script based on a plurality of impact scores for each scene of the plurality of scenes. The computer-generated object script may include a time duration of an appearance of each object of the set of objects 118 in the video 112, and a type of the respective object. Based on the computer-generated object script, the electronic device 102 may recommend the one or more first audio tracks as the sound effect for the first scene 114A based on a highest impact score of the at least one first object 118A among the plurality of impact scores.

In another embodiment, the electronic device 102 may employ the trained NN model 104 for the classification of the one or more first audio tracks in the audio database 106, the detection of the set of objects 118 in the video 112, the determination of the impact score of each object of the set of objects 118, and the recommendation of the one or more first audio tracks for the first scene 114A. The electronic device 102 may thereby automate the tasks of the classification of the plurality of audio tracks, the analysis of the video 112, mapping of one or more first audio tracks to the video 112, and the recommendation of the one or more first audio tracks for the first scene 114A based on the impact score, thereby reducing manual effort and time, and eliminating resource constraints.

Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may include the electronic device 102, a display device, and additional databases.

Figure 2:
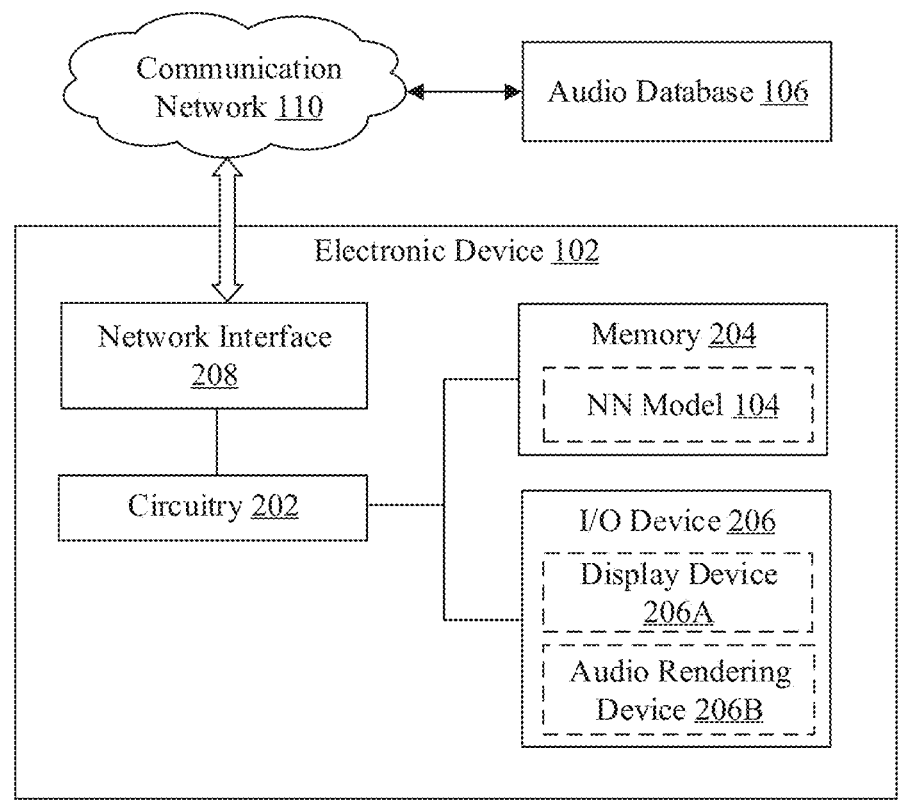
FIG. 2 is a block diagram that illustrates an exemplary electronic device for recommendation of audio based on video analysis, in accordance with an embodiment of the disclosure.

FIG. 2 is a block diagram that illustrates an exemplary electronic device for recommendation of audio based on video analysis, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which may perform operations for application of the neural network (NN) model 104 and recommendation of one or more first audio tracks. The electronic device 102 may further include a memory 204, an input/output (I/O) device 206, and a network interface 208. The memory 204 may include the NN model 104. The circuitry 202 may be communicatively coupled to the memory 204, the I/O device 206, the network interface 208, and the audio database 106.

The circuitry 202 may include suitable logic, circuitry, and interfaces that may be configured to execute program instructions associated with different operations to be executed by the electronic device 102. For example, some of the operations may include reception of the one or more frames 116, application of the NN model 104, determination of the impact score, selection of the first object 118A, and the recommendation of the one or more first audio tracks. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces, and/or code that may be configured to store the instructions to be executed by the circuitry 202. The memory 204 may be configured to store the received video 112, the determined impact score, and the recommended one or more first audio tracks. In some embodiments, the memory 204 may be configured to store the computer-generated object script, and the original script of the video 112. The electronic device 102 may further store a first set of coordinate values of each object the set of objects 118, a second set of coordinate values of each object the set of objects 118, and an estimated speed of detected motion of one or more objects of the set of objects 118. The memory 204 may be further configured to store the NN model 104 that may be configured to determine the impact score of each object of the detected set of objects 118. The memory 204 may be further configured to store the training data for the NN model 104 and the object detection data received from the server 108. The memory 204 may be further configured to store an emotional quotient, genre information, and the equalized one or more first audio tracks. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 may be configured to receive a first input that may include the video 112. In some other embodiments, the I/O device 206 may be configured to receive a user input that may include an original script of the video 112 (such as a movie). In another embodiment, the I/O device 206 may be configured to receive a user input for an equalization of the recommended one or more first audio tracks. The I/O device 206 may be configured to output the recommended one or more first audio tracks via a display device 206A and/or an audio rendering device 206B. The I/O device 206 may include various input and output devices, which may be configured to communicate with the circuitry 202. Examples of the I/O device 206 may include, but are not limited to, the display device 206A, the audio rendering device 206B, a touch screen, a keyboard, a mouse, a joystick, and a microphone.

The display device 206A may include suitable logic, circuitry, and interfaces that may be configured to display the recommended one or more first audio tracks. In another embodiment, the display device 206A may be configured to display the determined impact score of each object of the set of objects 118. The display device 206A may be a touch screen which may receive a user input via the display device 206A. The touch screen may be at least one of a resistive touch screen, a capacitive touch screen, or a thermal touch screen. The display device 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 206A may refer to a display screen of a head mounted device (HMD), a smart-glass device, a see-through display, a projection-based display, an electro-chromic display, or a transparent display.

The audio rendering device 206B may include suitable logic, circuitry, and interfaces that may be configured to reproduce or playback the recommended one or more audio tracks, and playback a final audio after addition of the recommended one or more audio tracks to the original audio track. In another embodiment, the audio rendering device 206B may be configured to reproduce or playback a selected audio track or the equalized one or more audio tracks. Examples of the audio rendering device 206B may include, but are not limited to, a loudspeaker, wall/ceiling speakers, a soundbar, a woofer or a sub-woofer, a soundcard, a headphone, a headset, a wireless speaker, and/or other computing device with audio reproduction capabilities.

The network interface 208 may include suitable logic, circuitry, and interfaces that may be configured to facilitate communication between the circuitry 202, the audio database 106, and the server 108, via the communication network 110. The network interface 208 may be implemented by use of various known technologies to support wired or wireless communication of the electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIGS. 3-10.

Figure 3:
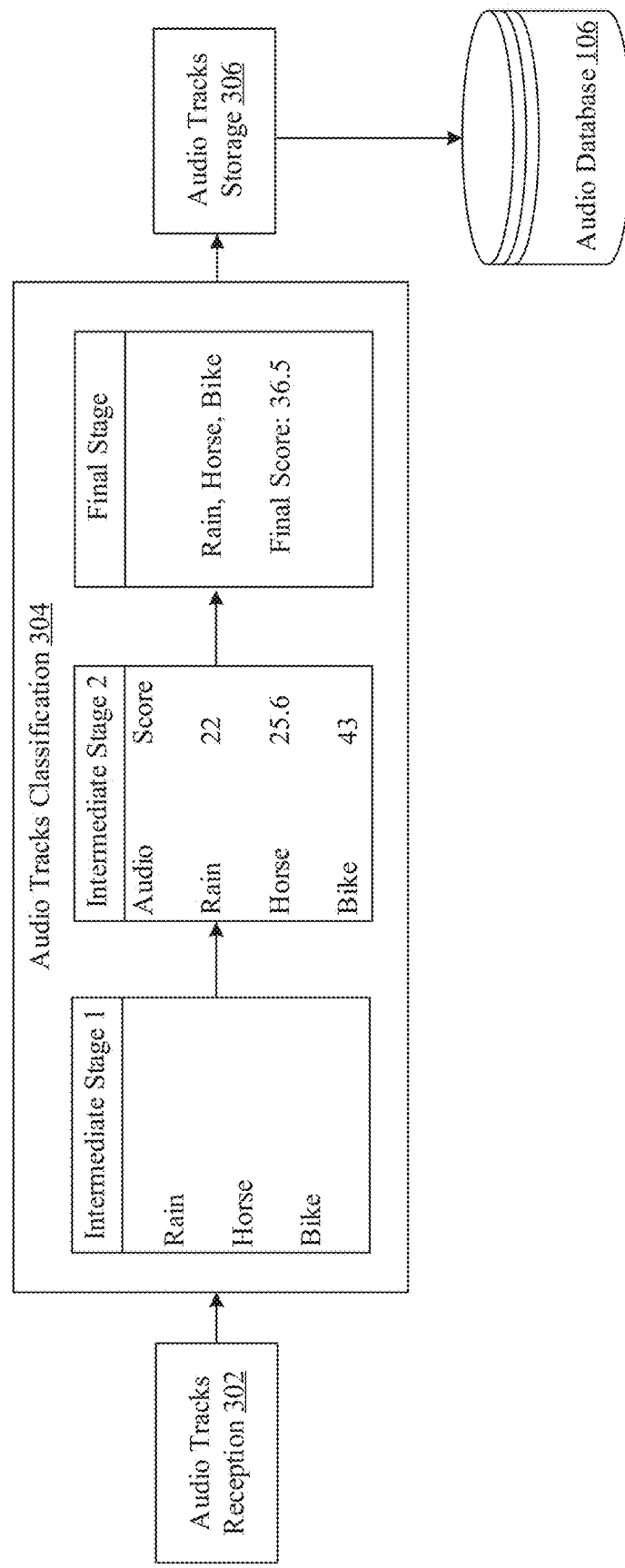
FIG. 3 is a diagram that illustrates exemplary operations for classification of audio tracks, in accordance with an embodiment of the disclosure.

FIG. 3 is a diagram that illustrates exemplary operations for classification of audio tracks, in accordance with an embodiment of the disclosure. FIG. 3 is explained in conjunction with elements from FIGS. 1-2. With reference to FIG. 3, there is shown a block diagram 300 that illustrates exemplary operations from 302 to 306, as described herein. The exemplary operations illustrated in the block diagram 300 may start at 302 and may be performed by any computing system, apparatus, or device, such as by the electronic device 102 of FIG. 1 or circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302, a plurality of audio tracks may be received. The circuitry 202 may be configured to receive the plurality of audio tracks from a user device or a media database. The received plurality of audio tracks may be unclassified. For example, each of the received plurality of audio tracks may not be associated with any category of object or any category of scene environment.

At 304, an audio classification may be performed. The circuitry 202 may be configured to classify each of the received plurality of audio tracks. The circuitry 202 may classify each of the received plurality of audio tracks into one or more categories based on a set of parameters associated with a corresponding audio track of the plurality of audio tracks. The set of parameters may include at least one of a mel-frequency cepstral coefficient (MFCC) parameter, a zero-crossing rate parameter, a spectral-roll off parameter, a spectral bandwidth, a spectral flux parameter, a spectral entropy parameter, a chroma vector parameter, a chroma deviation parameter, an energy parameter, or a pitch parameter.

In an embodiment, the circuitry 202 may be configured to determine a value of each of the set of parameters and may classify each of the received plurality of audio tracks into one or more categories based on the determined values. In another embodiment, the circuitry 202 may be configured to apply the NN model 104 (such as a YOLO network) on each of the received plurality of audio tracks. The circuitry 202 may further classify the received plurality of audio tracks into one or more categories based on the application of the NN model 104 on the received plurality of audio tracks.

The audio classification may be performed in one or more stages. In a first intermediate stage (i.e. intermediate stage 1), the circuitry 202 may identify and separate one or more sound sources (i.e. objects) in a first audio track of the received plurality of audio tracks based on the different frequency of each sound source using, for example, Inverse Fourier transform. For example, the first audio track may include sound sources such as rain, horse, and bike. In an embodiment, the intermediate stage 1 classification may be performed iteratively in which the circuitry 202 may identify a specific audio element against its surroundings in every iteration. At the completion of the intermediate stage 1, the circuitry 202 may assign each sound source with a label (such as "rain", "horse", or "bike") along with other related metadata.

In a second intermediate stage (i.e. intermediate stage 2), the circuitry 202 may determine an impact score of each of the identified sound sources (such as rain, horse, and bike). The impact score of a sound source may correspond to an impact of the sound source on the first audio track. By way of example and not limitation, the impact score of the "rain" in the first audio track may be 22, the impact score of the "horse" may be 25.6, and the impact score of the "bike" may be 43. In the final stage of the audio classification, the circuitry 202 may calculate a final score of the first audio track. The final score may be a combined score, and may be calculated based on the score of each of the identified sound sources (such as rain, horse, and bike). By way of example, the final score of the first audio track may be 36.5.

At 306, the plurality of audio tracks may be stored. The circuitry 202 may be configured to store each of the classified audio tracks in the audio database 106. Each audio track may be pushed to the audio database 106 with metadata associated with the classification, the score for each sound source, and the final score. The classified audio tracks may be used for recommendation of the one or more audio tracks, as described in FIGS. 1, 2, 4, 5, 6, and 9.

Figure 4:
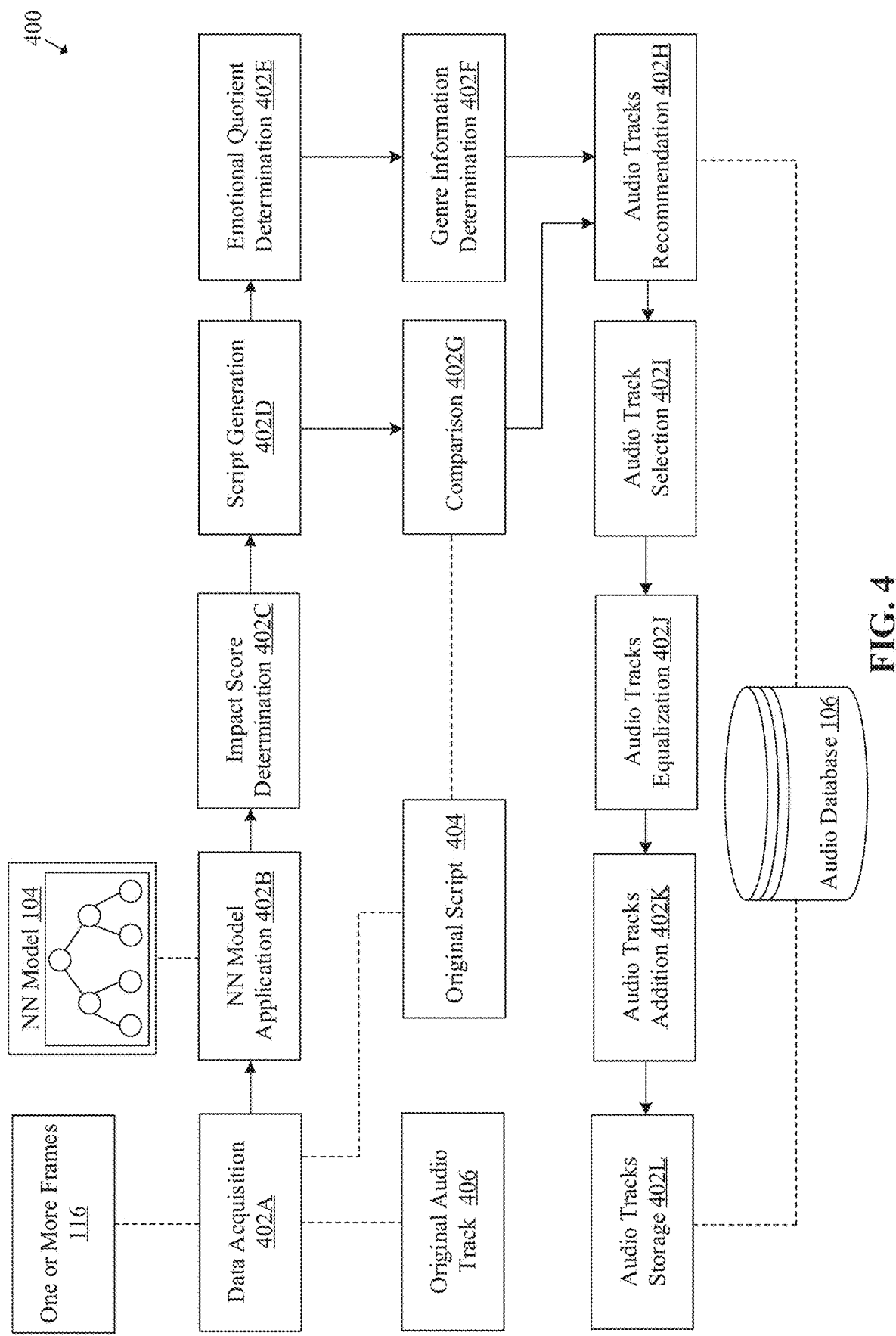
FIG. 4 is a diagram that illustrates exemplary operations for recommendation of audio based on video analysis, in accordance with an embodiment of the disclosure.

FIG. 4 is a diagram that illustrates exemplary operations for recommendation of audio based on video analysis, in accordance with an embodiment of the disclosure. FIG. 4 is explained in conjunction with elements from FIGS. 1-3. With reference to FIG. 4, there is shown a block diagram 400 that illustrates exemplary operations from 402A to 402L, as described herein. The exemplary operations illustrated in the block diagram 400 may start at 402A and may be performed by any computing system, apparatus, or device, such as by the electronic device 102 of FIG. 1 or circuitry 202 of FIG. 2. Although illustrated with discrete blocks, the exemplary operations associated with one or more blocks of the block diagram 400 may be divided into additional blocks, combined into fewer blocks, or eliminated, depending on the particular implementation.

At 402A, a data acquisition operation may be performed. In the data acquisition operation, the circuitry 202 may receive the one or more frames 116 of the first scene 114A of the plurality of scenes 114 of the video 112. As shown in FIG. 1, the first scene 114A may include the set of objects 118. The set of objects 118 may include the first object 118A and the second object 118B visible in a foreground of the first scene 114A from a perspective of a viewer of the video 112, and the third object 118C in a background of the first scene 114A from the perspective of the viewer. By way of example, each of the set of objects 118 may be visible in the foreground of the first scene 114A. In another example, the set of objects 118 may include one or more objects that makes an appearance from an edge of the first scene 114A, moves across the first scene 114A, and moves out of the first scene 114A from another edge of the first scene 114A or fades away in the background of the first scene 114A. In another example, the set of objects 118 may include one or more objects that may not visible in the first scene 114A, but may have an impact on the first scene 114A.

In an embodiment, the circuitry 202 may receive the one or more frames 116 of the first scene 114A from the server 108 (such as a media server). In some embodiments, the circuitry 202 may receive the one or more frames 116 of the first scene 114A from a web storage platform via a uniform resource locator (URL). In another embodiment, the one or more frames 116 of the first scene 114A may be received via the memory 204.

At 402A, the circuitry 202 may be further configured to receive an original script 404 of the video 112. In an embodiment, the original script 404 may be received from a user device associated with the user 120. The original script 404 may be a written work (such as a screenplay) for the video 112 that may express at least one of a movement, an action or a dialogue of one or more animate objects of the set of objects 118. For example, the plurality of scenes 114 of the video 112 may be captured based on the original script 404. The received original script 404 may be stored in the memory 204 of the electronic device 102.

In another embodiment, the circuitry 202 may further receive an original audio track 406. The original audio track 406 may include one or more dialogues spoken by one or more objects of the set of objects 118. In some embodiments, the original audio track 406 may be received along with the video 112. In an embodiment, each frame of the one or more frames 116 may be captured by different image capture devices from multiple viewpoints, resulting in multiple frames. In such a case, an average frame from the multiple frames may be created, and the average frame may be considered as the first frame 116A.

At 402B, a neural network (NN) model (such as the NN model 104) may be applied. The circuitry 202 may be configured to apply the trained NN model 104 on the received one or more frames 116 of the first scene 114A to detect the set of objects 118. Prior to the application of the NN model 104, the circuitry 202 may be configured to train the NN model 104. The circuitry 202 may train the NN model 104 on one or more features related to the set of objects 118 to obtain the trained NN model 104. The one or more features related to the set of objects 118 may include, but are not limited to, statistical features and geometrical features.

The circuitry 202 may perform initial noise reduction on the first scene 114A using an image processing technique and may determine whether the noise level in the first scene 114A is above a certain threshold after the noise reduction. In case the noise level is still above the certain threshold, the first scene 114A may be discarded from analysis. In case the noise level is below the certain threshold, the circuitry 202 may subject the first scene 114A to object detection using an object detector (such as the YOLO detector). The circuitry 202 may then track the set of objects 118 in the first scene 114A using the Deep Sort algorithm to predict a best fit for the bounding boxes for the set of objects 118. The Deep Sort algorithm may additionally employ a Kalman filter to treat noise in the detection of the set of objects 118 and prior state for the prediction of the best fit for the bounding boxes. The circuitry 202 may track each object of the set of objects 118 in the first scene 114A to determine changes in x-axis and y-axis of coordinates of the bounding boxes and may determine the amount and direction of movement of each object. The amount and direction of movement of each object of the set of objects 118 may be used for determination of the impact score, and for recommendation of the one or more audio tracks, as described, for example, in FIGS. 6 and 7.

At 402C, an impact score may be determined. The circuitry 202 may be configured to determine the impact score associated with each object of the set of objects 118 in the first scene 114A. The circuitry 202 may determine the impact score based on the application of the trained NN model 104 on the set of objects 118. The impact score may be determined based on the output of the NN model 104. The impact score may indicate the weight assigned to the respective object among the set of objects 118 of the first scene 114A. For example, the impact score may indicate an impact of the respective object of the set of objects 118 on the first scene 114A and may be expressed in numerical values or percentages. In some embodiments, the impact score of the respective object of the set of objects 118 may be based on a time period for which the respective object may be visible in the first scene 114A. In another embodiment, the impact score of the respective object of the set of objects 118 may be based on one of a relative size, the amount of movement, a speed of movement, the direction of movement, an emotional quotient, or any other user-defined feature of the respective object in the first scene 114A. For example, the impact score of the respective object (such as a ticking clock) of the set of objects 118 may be higher in case the first scene 114A depicts another object (such as a human) who has been impatiently waiting for a long time. In another example, the impact score of the respective object (such as an airplane in a background) of the set of objects 118 may be higher in case the first scene 114A depicts another object (such as a human) arriving at an airport to take a flight. In an embodiment, the circuitry 202 may be configured to determine a plurality of impact scores corresponding to the set of objects 118.

At 402D, a script may be generated. The circuitry 202 may be configured to generate a computer-generated object script based on a plurality of impact scores for each scene of the plurality of scenes 114. The computer-generated object script may include a time duration of an appearance of each object of the set of objects in the video 112, a type of the respective object, and the impact score of the respective object in the time duration. The details about the computer-generated object script are provided, for example, in FIG. 5.

At 402E, an emotional quotient may be determined. The circuitry 202 may be configured to determine an emotional quotient for each scene of the plurality of scenes 114 based on the computer-generated object script for the corresponding scene. The emotional quotient may be a numerical value that may provide information about an emotion of the one or more animate objects of the set of objects 118 in the corresponding scene. In some embodiments, the circuitry 202 may be configured to determine the emotional quotient of the first scene 114A based on the computer-generated object script for the first scene 114A. In some embodiments, the circuitry 202 may be configured to determine the emotional quotient of the second scene 114B based on the original script of the first scene 114A and the second scene 114B. In another embodiment, the circuitry 202 may analyze the first scene 114A to determine the emotional quotient of the first scene 114A. In another embodiment, the circuitry 202 may be configured to determine the emotional quotient of the first scene 114A based on textual data related to the first scene 114A. The textual data related to first scene 114A may correspond to a brief summary about the first scene 114A. The brief summary may be written by an editor, a director, a screenplay writer, etc. The circuitry 202 may receive the textual data and determine the emotional quotient based on the received textual data. The circuitry 202 may feed the textual data to a natural processing language (NLP) model to extract keywords representing emotion, highlights, and correlation between the one or more objects 118 to include non-visible objects which may not be present in the first scene 114A. The extracted keywords may be used for ambience recommendation and to filter out unnecessary objects which may have less impact over the first scene 114A.

In an embodiment, the circuitry 202 may compute the emotional quotient for a current scene of the plurality of scenes 114 using a cache store (such as in the memory 204) that holds impact score data of previously recommended audio tracks and key impact points associated with previous scenes of the plurality of scenes 114. In case the impact scores of the current scene is greater than the impact scores of the previous scenes, the circuitry 202 may update the value of the emotional quotient for the current scene. In case the impact scores of the current scene is lower than the impact scores of the previous scenes, the previous values of the emotional quotient may be used for the recommendation of one or more audio tracks. This improves the accuracy of the recommendation since the metadata of the previous scenes are stored and updated based on the analysis of every scene of the plurality of scenes 114.

For example, the second scene 114B may include the first object 118A (such as a person) entering an airport after experiencing a sad tragedy in the first scene 114A. The circuitry 202 may read the metadata (such as ambience information based on sounds in the previous scene) associated with the first scene 114A. The circuitry 202 may use the read metadata associated with the first scene 114A for recommendation of sad ambience music for the second scene 114B along with one or more audio tracks related to airport sounds, objects around the person, actions performed by the person, and other ambient sounds (for example, airport announcements, interactions, etc.).

At 402F, genre information may be determined. The circuitry 202 may be configured to determine genre information associated with the first scene 114A based on an original audio of the first scene 114A and the determined emotional quotient associated with the first scene 114A. The original audio may correspond to an audio of at least one of the set of objects 118. The genre information may include, for example, a genre type of each scene of the corresponding scene. The genre type may correspond to a particular type of film, a scene type, or tags related to other art forms. Common examples of the genre type may include, but are not limited to, action, adventure, animation, comedy, courtroom, crime, epic, erotica, fantasy, film noir, historical, horror, mystery, philosophical, political, religion, romance, saga, satire, science fiction, slice of life, spy, supernatural, thriller, urban, war, and biography. In some embodiments, to determine a genre type for every identified scene, the circuitry 202 may derive granular tags from the original script 404. Examples of granular tags may include, but are not limited to, plot types (e.g. comedy, tragedy, superhero, adventure, etc.), dramatic situations (e.g. disaster, revolt, crimes of love, remorse, etc.), story types (e.g. action, animation, biography, comedy, crime, fantasy, etc.), and/or themes (e.g. redemption, resurrection, innocence, jealousy, sacrifice, etc.).

At 402G, a comparison between the original script 404 and the computer-generated object script may be performed. In the comparison operation, the circuitry 202 may be configured to compare the original script 404 and the computer-generated object script one or more scenes of the plurality of scenes 114. For example, the circuitry 202 may determine a first time duration of presence of each object in the corresponding scene from the original script 404 and may compare the first time duration with a second time duration of each object in the computer-generated object script. In an embodiment, the circuitry 202 may implement one or more text comparison techniques to compare the original script 404 and the computer-generated object script. The detailed implementation of the text comparison techniques may be known to one skilled in the art, and therefore, a detailed description for the text comparison techniques has been omitted from the disclosure for the sake of brevity. The circuitry 202 may use the result of the comparison for recommendation of one or more second audio tracks.

At 402H, one or more audio tracks may be recommended. The circuitry 202 may be configured to recommend one or more audio tracks, from the audio database 106, as sound effects for at least one scene of the plurality of scenes 114. The one or more audio tracks may include one or more first audio tracks, one or more second audio tracks, one or more second third tracks, and one or more fourth audio tracks. The recommended one or more audio tracks may include at least one of Foley sounds, ambient sounds, or background music from the audio database 106, which may store the classified audio tracks, as described in FIG. 3. In an embodiment, the circuitry 202 may be configured to recommend the one or more first audio tracks for the first scene 114A based on a highest impact score of the at least one first object 118A among the plurality of impact scores. In another embodiment, the circuitry 202 may be configured to recommend one or more second audio tracks for the first scene 114A based on the comparison of the original script and the computer-generated object script. In another embodiment, the circuitry 202 may be further configured to recommend one or more third audio tracks for the second scene 114B based on the emotional quotient of the second scene 114B. For example, the circuitry 202 may recommend background ambience sounds, which make the first scene 114A more immersive, based on the emotional quotient. In another embodiment, the circuitry 202 may be further configured to recommend the one or more fourth audio tracks based on the determined genre information and determined direction of the original audio (as described in FIG. 7).

In an embodiment, the electronic device 102 may be capable of recommending the one or more audio tracks in real time with the capture of the video 112. In such an implementation, the electronic device 102 may be attached to an image capture device. The electronic device 102 may control the image capture device to capture a set of images (such as the video 112) and transmit the captured set of images to the electronic device 102. The electronic device 102 may further recommend one or more audio tracks for the captured set of images.

At 402I, an audio track may be selected. The circuitry 202 may be configured to select at least one audio track from the recommended one or more audio tracks. In an embodiment, the circuitry 202 may be configured to select a combination of audio tracks from the recommended one or more audio tracks. The audio track may be selected based on a user input received from the user 120 via the user device. The selected audio track may be the most suitable sound effect for the first scene 114A based on the user input. In an embodiment, the circuitry 202 may filter the recommended one or more audio tracks based on their relevance to the first scene using the emotional quotient determined at 402E.

At 402J, an audio tracks equalization may be performed. The circuitry 202 may be configured to equalize the recommend one or more audio tracks or the selected audio track based on the received user input. The circuitry 202 may receive a user input to equalize the one or more audio tracks. Based on the received user input, the circuitry 202 may equalize the one or more audio tracks. The equalization of the one or more audio tracks may comprise a process of changing a balance of one or more different components (such as bass, tempo, and pitch) in the recommended one or more audio tracks or the selected audio track. The equalization of the one or more audio tracks may enhance a quality of the one or more audio tracks. The equalization of the one or more audio tracks may be performed to match one or more requirements of the first scene 114A.

At 402K, the one or more audio tracks may be added. The circuitry 202 may be configured to add the equalized one or more audio tracks (or an equalized audio track) as the sound effect to the original audio track 406 of the first scene 114A. The original audio track 406 may include audio representation of one or more dialogues spoken by one or more objects of the set of objects 118. In an embodiment, the equalized one or more audio tracks may be merged with the original audio track 406 at respective timestamps of the first scene 114A.

At 402L, one or more audio tracks may be stored. The equalized one or more audio tracks (or the equalized audio track) may be stored in the audio database 106. In some embodiments, the equalized one or more audio tracks may be stored along with the label (such as a type of corresponding object) and the impact score of the corresponding object.

FIG. 5 is a diagram that illustrates a portion of a computer-generated object script associated with a video, in accordance with an embodiment of the disclosure. FIG. 5 is explained in conjunction with elements from FIGS. 1-4. With reference to FIG. 5, there is shown a portion of a computer-generated object script 500 associated with the video 112.

The circuitry 202 may apply the NN model 104 to generate the computer-generated object script 500 based on the plurality of impact scores for each scene of the plurality of scenes 114. Each impact score of the plurality of impact scores corresponds to a respective object of the set of objects 118. The computer-generated object script 500 may include a time duration of an appearance of each object of the set of objects 118 in the video 112, a type of the respective object, and the impact score of the respective object in the time duration. With reference to FIG. 5, the time duration of an appearance of each object of the set of objects 118 in the video 112 may be represented by a column 502, the type of the respective object may be represented by the column 504, and the impact score of the respective object in the time duration may be represented by the column 506.

For example, in the time duration between 0.22 and 5.22 of the first scene 114A, the impact score of a first object (e.g. horse) may be 20. Similarly, in the time duration between 12.29 and 16.13 of the first scene 114A, the impact score of a second object (e.g. bike) may be 28. In another example, in the time duration between 47.55 and 49.20 of the first scene 114A, the impact score of a third object (e.g. gun) may be 6, the impact score of the bike may be 34.55, and the impact score of the horse may be 27.34, and so on. In an embodiment, as described in FIG. 4, the circuitry 202 may recommend the one or more first audio tracks for the first scene 114A based on a highest impact score of at least one object among the plurality of impact scores in the computer-generated object script 500. For example, for the time duration between 47.55 and 49.20, the circuitry 202 may determine that the bike has the highest impact score (e.g. 34.55) and may recommend one or more audio tracks related to the bike for the time duration between 47.55 and 49.20 of the first scene 114A.

Figure 6:
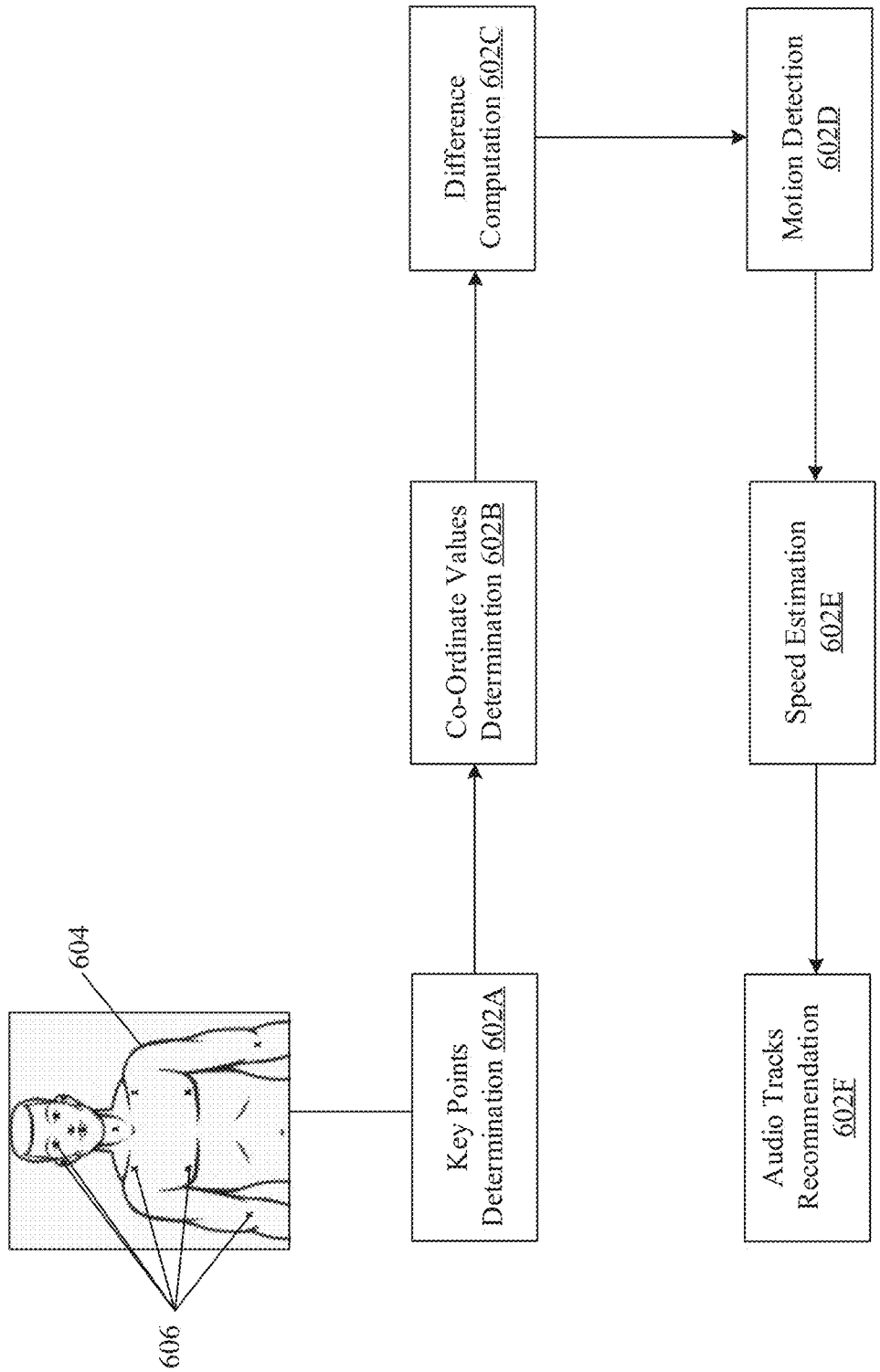
FIG. 6 is a diagram that illustrates exemplary operations for recommendation of audio based on a motion of an object, in accordance with an embodiment of the disclosure.

FIG. 6 is a diagram that illustrates exemplary operations for recommendation of audio based on a motion of an object, in accordance with an embodiment of the disclosure. FIG. 6 is explained in conjunction with elements from FIGS. 1-5. With reference to FIG. 6, there is shown a block diagram 600 that illustrates exemplary operations from 602A to 602F, as described herein. The exemplary operations illustrated in the block diagram 600 may start at 602A and may be performed by any computing system, apparatus, or device, such as by the electronic device 102 of FIG. 1 or circuitry 202 of FIG. 2. Although illustrated with discrete blocks, the exemplary operations associated with one or more blocks of the block diagram 600 may be divided into additional blocks, combined into fewer blocks, or eliminated, depending on the particular implementation.

At 602A, key points may be determined. The circuitry 202 may be configured to determine a set of key points 606 associated with a posture of at least one first object 604 of a set of objects (such as the set of objects 118). The circuitry 202 may be configured to determine the set of key points 606 based on application of a pose estimation algorithm on the first object 604. The set of key points 606 may be determined for recommendation of one or more audio tracks associated with an action performed by the first object 604 or the motion of the first object 604. For example, the first object 604 may be applauding in the first scene 114A, and an audio track associated with applause may be recommended based on the determined set of key points associated with the motion of the first object 604. In another example, the first object 604 may be engaged in a hand-to-hand combat with another person in the first scene 114A, and an audio track associated with hand-to hand combat (e.g. punching sound) may be recommended based on the determined set of key points associated with the motion of the first object 604.

As depicted in FIG. 6, the set of key points 606 may be associated with the posture of the first object 604 of the set of objects 118. By way of example and not limitation, the first object 604 may be human, and the determined set of key points 606 may be associated with, but not limited to, eyes, nose, lips, ears, shoulders, chest, elbows, and wrists.

At 602B, co-ordinate values may be determined. The circuitry 202 may be configured to determine a first set of coordinate values associated with each of the set of key points 606 at a first timestamp. Each coordinate value may include values of at least two coordinates (such as X and Y). The circuitry 202 may be further configured to determine a second set of coordinate values associated with the set of key points at a second timestamp. For example, the second timestamp may correspond to a time in the first scene 114A where a specific action (such as punch, running, etc.) may be detected. By way of example, the circuitry 202 may determine the first set of coordinate values associated with the set of key points from the first frame 116A of the one or more frames 116 and the second set of coordinate values associated with the set of key points 606 from the second frame 116B of the one or more frames 116.

At 602C, a difference may be computed. The circuitry 202 may be configured to compute a first difference between the determined first set of coordinate values and the determined second set of coordinate values. The circuitry 202 may be further configured to compute a second difference between the first timestamp and the second timestamp. For example, the difference between the first time stamp and the second timestamp may be about 1 second, and the motion of the first object 604 may be backtracked for up to 100 seconds of the video 112.

At 602D, a motion may be detected. The circuitry 202 may detect the motion of the first object 604 based on the computed first difference and the computed second difference. In some embodiments, the circuitry 202 may be configured apply the NN model 104 on the computed first difference and the computed second difference. The NN model 104 may be trained to detect the motion of the first object 604 based on the computed first difference between the first set of coordinate values and the second set of coordinate values and the computed second difference between the first timestamp and the second timestamp.

By way of example and not limitation, a pseudocode for detection of the motion of the first object 604 (such as a human body) is as follows:

```
Continue until action is detected:
    Points_dict = {get all the points for each body part through
    pose estimation algorithm}
    Points_buffer_dict={ }
    for each point in points_dict:
        add points in points buffer dictionary until 100 seconds
    If action detected:
        get all the points from buffer for the body parts
        involved in the action and
        determine the impact for the action.
```

At 602E, a speed of the action or motion may be estimated. The circuitry 202 may be configured to estimate the speed of the motion of the first object 604 based on the computed first difference and the computed second difference. In an embodiment, the circuitry 202 may apply the NN model 104 on the computed first difference and the second difference to estimate the speed of the motion of the first object 604.

At 602F, one or more second audio tracks may be recommended. The circuitry 202 may be configured to recommend one or more second audio tracks as the sound effect for the first scene 114A based on the detected motion and/or the estimated speed of the motion. For example, the recommend one or more second tracks may be associated with the detected motion and the speed of the detected motion. For example, the first object 604 may perform a hand-to-hand combat action (such as a punch), and the recommend one or more audio tracks may be related to hand-to-hand combat (such as punching sound). In case the speed of the hand-to-hand combat action of the first object 604 is higher (based on the estimated speed of motion of the determined set of key points 606), the impact score of the detected action of the first object 604 may be higher. The circuitry 202 may recommend one or more audio second tracks associated with the detected action of the first object 604 based on the higher impact score.

Figure 7:
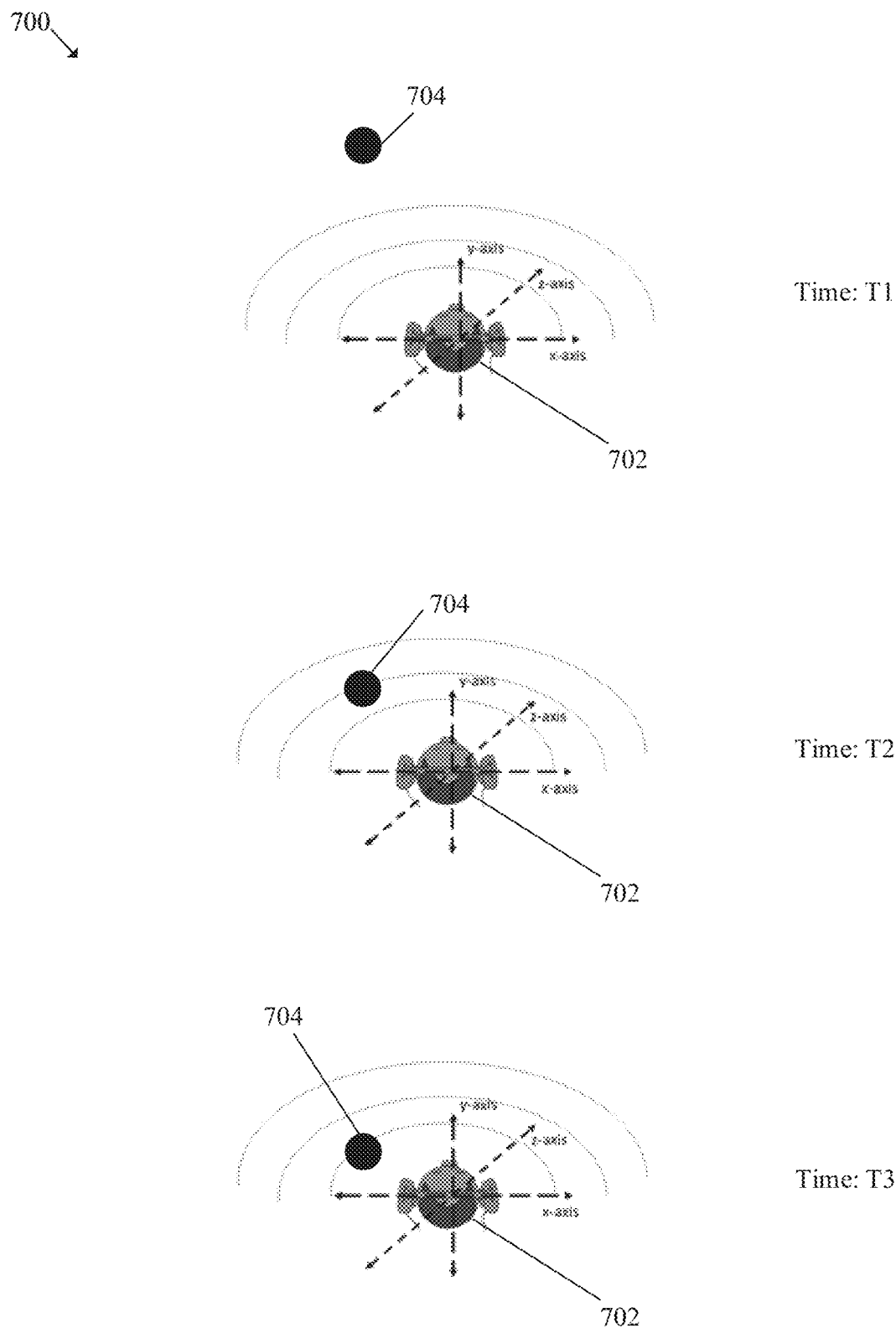
FIG. 7 is a diagram that illustrates an exemplary scenario for determination of a direction of audio of an object, in accordance with an embodiment of the disclosure.

FIG. 7 is a diagram that illustrates an exemplary scenario for determination of a direction of audio of an object, in accordance with an embodiment of the disclosure. FIG. 7 is explained in conjunction with elements from FIGS. 1-6. With reference to FIG. 7, there is shown an exemplary scenario 700. In the exemplary scenario 700, there is shown a three-dimensional spatial audio representation of the video 112 with respect to a viewer 702. There is further shown a circle that represents a sound source 704 (such as an approaching object in the first scene 114A) in the video 112.

At time T1, the circuitry 202 may be configured to determine a position of the sound source 704 and a direction of movement of the sound source 704 (such as an approaching bike) in the video 112 based on an analysis of the first frame 116A of the one or more frames 116 of the first scene 114A. The circuitry 202 may determine the position of the sound source 704 and the direction of movement of the sound source 704 with respect to all three axes (X, Y, and Z axes) of the three-dimensional spatial audio representation.

Similarly, at times T2 and T3, the circuitry 202 may determine the position of the sound source 704 and the direction of movement of the sound source 704 in the video 112 based on an analysis of the second frame 116B and a third frame of the one or more frames 116 of the first scene 114A. Based on the determination of the direction of the movement of the sound source 704, the circuitry 202 may be configured to recommend the one or more audio tracks for the first scene 114A. In an embodiment, the sound effect (e.g. the recommended one or more audio tracks) added to the original audio track 406 of the video 112 may be a 3D sound effect, and a direction of the sound effect may correspond to the direction of the sound source 704 in the video 112, to thereby provide an immersive audio experience to the viewer 702.

Figure 8:
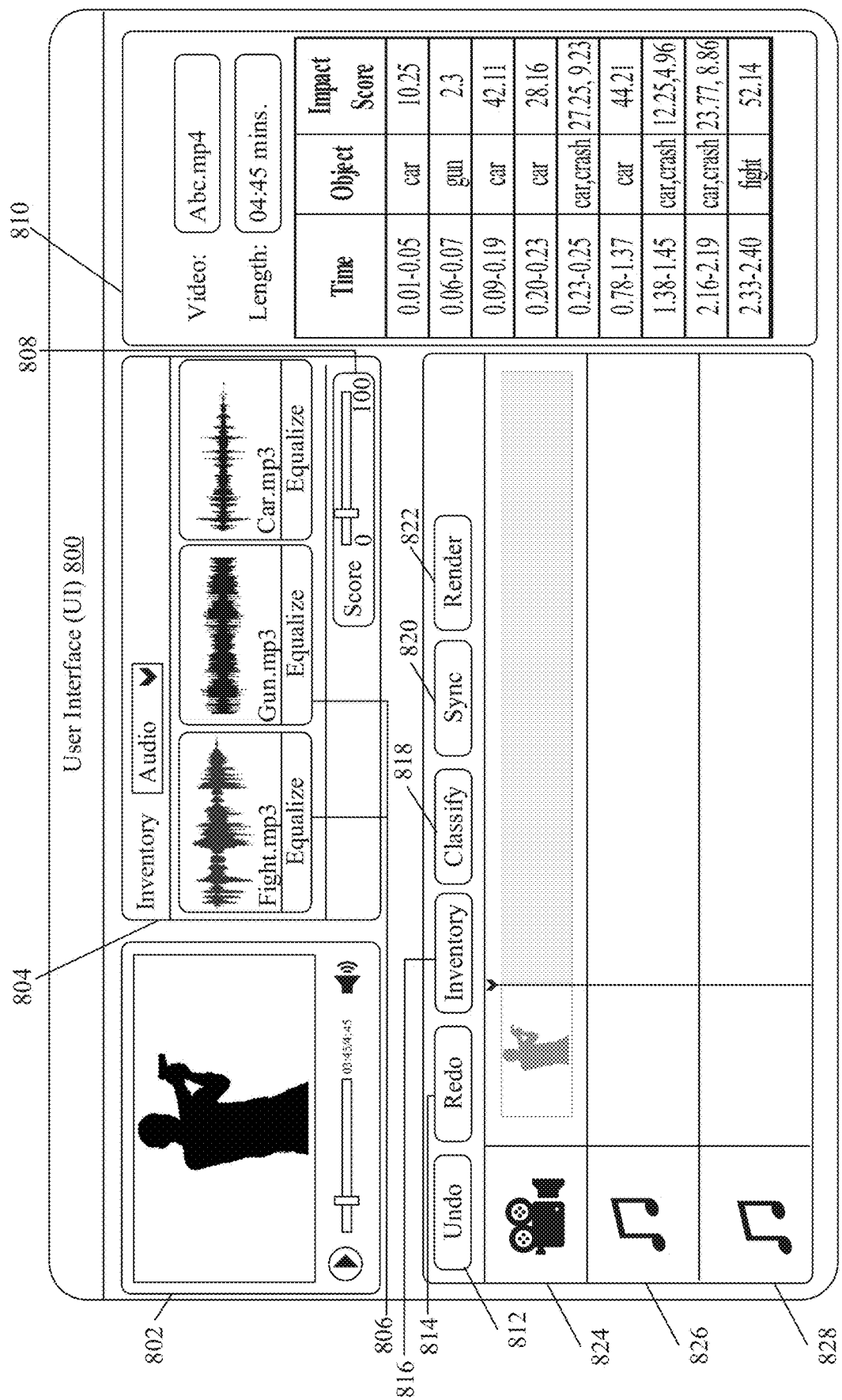
FIG. 8 is a diagram that illustrates an exemplary user interface for addition of recommended audio tracks to one or more scenes, in accordance with an embodiment of the disclosure.

FIG. 8 is a diagram that illustrates an exemplary user interface for addition of recommended audio tracks to one or more scenes, according to at least one embodiment described in the present disclosure. FIG. 8 is explained in conjunction with elements from FIGS. 1-7. With reference to FIG. 8, there is shown a user interface (UI) 800. The UI 800 may be displayed on the display device 206A (shown in FIG. 2) or on a user device associated with the user 120 based a request from the user device. The circuitry 202 may cause the UI 800 to be displayed for recommendation of one or more audio tracks and addition of the recommended one or more audio tracks to the video 112. The circuitry may receive the request via an application interface displayed on a display screen of the user device. The application interface may be part of an application software, for example, a software development kit (SDK), a cloud server-based application, a web-based application, an OS-based application/application suite, an enterprise application, a mobile application for recommendation of the one or more audio tracks.

In the UI 800, there is shown a set of UI elements, such as a first UI element 802, a second UI element 804, a third UI element 806, and a fourth UI element 808, a fifth UI element 810, a sixth UI element 812, a seventh UI element 814, an eighth UI element 816, a ninth UI element 818, a tenth UI element 820, an eleventh UI element 822, a twelfth UI element 824, a thirteenth UI element 826 and a fourteenth UI element 828 associated with the recommendation of the audio tracks based on the video analysis.

The first UI element 802 may be display the first scene 114A of the video 112 along with playback controls to control a playback of the first scene 114A. The second UI element 804 may display the recommended one or more audio tracks from an inventory (such as the audio database 106). The third UI element 806 may be a button and may be used to launch an audio equalizer to equalize the corresponding audio track. The fourth UI element 808 may be a range slider and may be used to filter the recommended one or more audio tracks based on impact score. The fifth UI element 810 may be a textbox and may display the computer-generated object script for the first scene 114A of the video along with a name of the video 112 and a length of the video 112.

The sixth UI element 812 may be an "Undo" button and may be used to undo a previous action performed by the user 120. The seventh UI element 814 may be a "Redo" button and may be used to restore any action that was previously undone using the undo function (or the sixth UI element). The eighth UI element 816 may be a button labeled as "Inventory". The eighth UI element 816 may be used to display and browse all the audio tracks stored in the audio database 106. The ninth UI element 818 may be a button labeled as "Classify". The ninth UI element 818 may be used to classify the plurality of audio tracks as described, for example, in FIG. 3.

The tenth UI element 820 may be a button labeled as "Sync". The tenth UI element 820 may be used to synchronize the original audio in the first scene 114A with the recommended one or more audio tracks to merge the original audio and the recommended one or more audio tracks. The eleventh UI element 822 may be a button labeled as "Render". The eleventh UI element 822 may be used to render the first scene 114A after the merging of the original audio and the recommended one or more audio tracks.

The twelfth UI element 824 may represent a timeline of the playback of the first scene 114A of the video 112. Similarly, the thirteenth UI element 826 and the fourteenth UI element 828 may represent timelines for the second scene 114B and the Nth scene 114N.

Figure 9:
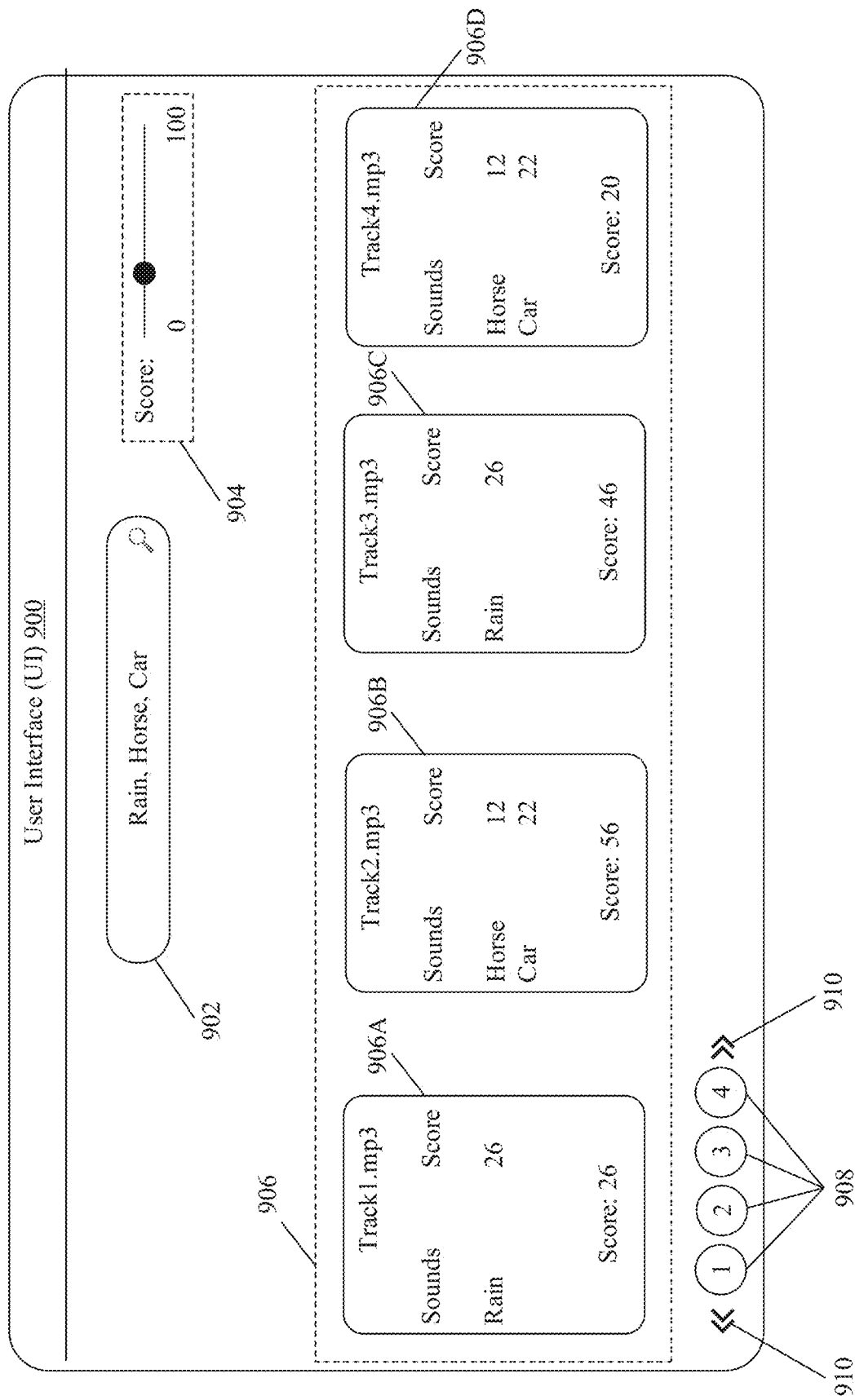
FIG. 9 is a diagram that illustrates an exemplary user interface for searching of audio tracks from an audio database, in accordance with an embodiment of the disclosure.

FIG. 9 is a diagram that illustrates an exemplary user interface for searching of audio tracks from an audio database, according to at least one embodiment described in the present disclosure. FIG. 9 is explained in conjunction with elements from FIGS. 1-8. With reference to FIG. 8, there is shown a user interface (UI) 900. The UI 900 may be displayed on the display device 206A (shown in FIG. 2) or on a user device associated with the user 120 based a search request from the user device. The search request may be received via an application interface displayed onto a display screen of the user device. In the UI 900, there is shown a set of UI elements, such as a first UI element 902, a second UI element 904, a set of third UI elements 906, a set of fourth UI elements 908, and a set of fifth UI elements 910.

The first UI element 902 may be a search bar and may be used to search one or more audio tracks associated with one or more objects. The one or more audio tracks may be stored in the audio database 106. By way of example and not limitation, the first UI element 902 may receive search terms to search for audio tracks such as "Rain", "Horse", and "Car". The second UI element 904 may be a range slider and may be used to filter results of the search based on the impact score of the audio tracks.

The set of third UI elements 906 may be textboxes that may display one or more search results along with the impact score of each audio track and the final score associated with each search result. The set of third UI elements 906 may represent top N search results, and may include a first search result UI element 906A, a second search result UI element 906B, a third search result UI element 906C, and a fourth search result UI element 906D. For example, in the second search result ("track2.mp3") represented by the second search result UI element 906B, the score of "Horse" may be 12, and the score of "Car" may be 22. The final score for the second search result may be 56. The set of fourth UI elements 908 (such as buttons to jump to specific pages) and the set of fifth UI elements 910 (such as buttons to jump to previous page and next page) may include buttons to navigate between the search results.

Figure 10:
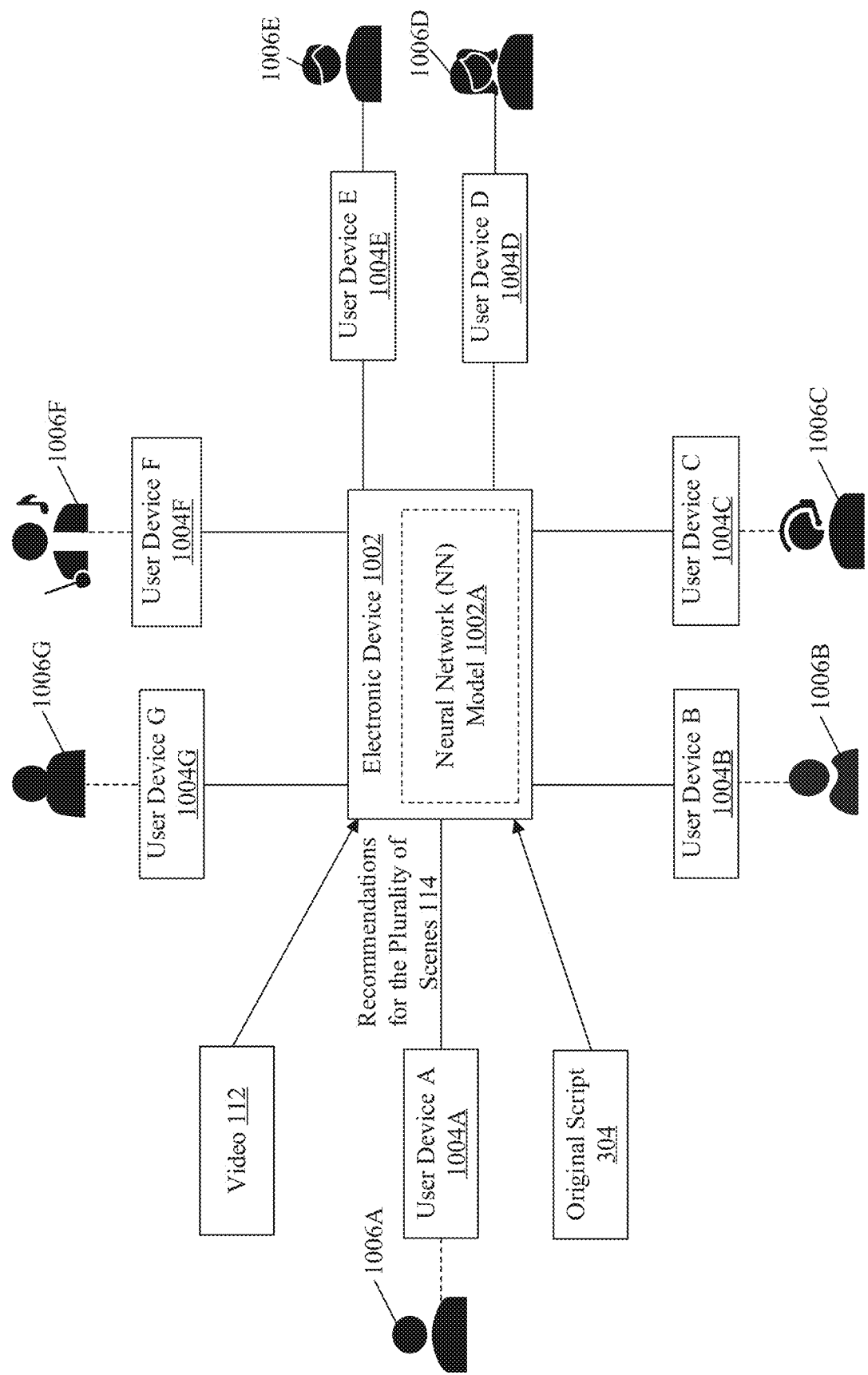
FIG. 10 is a diagram that illustrates an exemplary workflow for production of audio based on video analysis, in accordance with an embodiment of the disclosure.

FIG. 10 is a diagram that illustrates an exemplary workflow for production of audio based on video analysis, in accordance with an embodiment of the disclosure. FIG. 10 is explained in conjunction with elements from FIGS. 1-9. With reference to FIG. 10, there is shown an electronic device 1002 that may include a neural network (NN) model 1002A. There is further shown a set of user devices that may be associated with a set of users. The set of user devices may include a user device A 1004A that may be associated with a first user 1006A, a user device B 1004B that may be associated with a second user 1006B, a user device C 1004C that may be associated with a third user 1006C, a user device D 1004D that may be associated with a fourth user 1006D, a user device E 1004E that may be associated with a fifth user 1006E, a user device F 1004F that may be associated with a sixth user 1006F, and a user device G 1004G that may be associated with a seventh user 1006G. The electronic device 1002 may be similar in functionality and configuration to the electronic device 102 shown in FIG. 1. The NN model 1002A may be similar in functionality and configuration to the NN model 104 shown in FIG. 1. Accordingly, the detailed description of the electronic device 1002 and the NN model 1002A are omitted herein, for the sake of brevity.

In an embodiment, the electronic device 1002 may receive the original script 404 and the video 112 (e.g. raw video footages) as input. The electronic device 1002 may generate and output recommendations of one or more audio tracks for every scene of the video 112 to the user device A 1004A. These recommendations may be edited by a sound editor (such as the first user 1006A) in real time in collaboration with creative experts. For example, each of the set of user devices (1004A-1004G) may be communicatively coupled with the electronic device 1002 and may provide one or more user inputs to produce the audio based on the analysis of the video 112. By way of example and not limitation, the first user 1006A may be the sound editor of the video 112. The first user 1006A may collaborate with the second user 1006B (such as a writer), the third user 1006C (such as a director), the fourth user 1006D (such as an actor), and the fifth user 1006E (such as an editor), the sixth user 1006F (such as a sound engineer), and the seventh user 1006G (such as an on-set expert).

The second user 1006B may be the writer of the original script 404 (such as the screenplay) for the video 112. The electronic device 1002 may receive the original script 404 and creative inputs as user input from the first user 1006A (such as the sound editor). The third user 1006C may be a director of the video 112. The third user 1006C may control the artistic as well as dramatic aspects of the video 112. The third user 1006C may visualize the original script 404 and may guide a technical crew and one or more actors in the creation of the video 112. The third user 1006C may provide creative inputs to the first user 1006A (such as the sound editor) via the electronic device 1002.

The fourth user 1006D may be an actor (or an actress) of the video 112. The fourth user 1006D may provide creative inputs to the first user 1006A (such as the sound editor) via the electronic device 1002. The fifth user 1006E may be an editor of the video 112. The editor may be responsible for organization of the one or more frames 116 in the plurality of scenes 114. The fifth user 1006E may be further responsible for editing camera footage, dialogue, sound effects, graphics, and special effects to generate a final video that may be suitable for an audience. The fifth user 1006E may provide creative inputs to the first user 1006A (such as the sound editor) via the electronic device 1002. In some embodiments, the fifth user 1006E may provide user input to equalize the recommended one or more audio tracks via the user device E 1004E.

The sixth user 1006F (such as the sound engineer) and the seventh user 1006G (such as the on-set expert) may each provide creative inputs to the first user 1006A (such as the sound editor) via the electronic device 1002. The first user 1006A (such as the sound editor) may filter the recommendations of the electronic device 1002 and/or edit the recommended one or more audio tracks and/or finetune the final audio/video output based on the creative inputs of the users (such as the second user 1006B, the third user 1006C, the fourth user 1006D, and the fifth user 1006E, the sixth user 1006F, and the seventh user 1006G).

Figure 11:
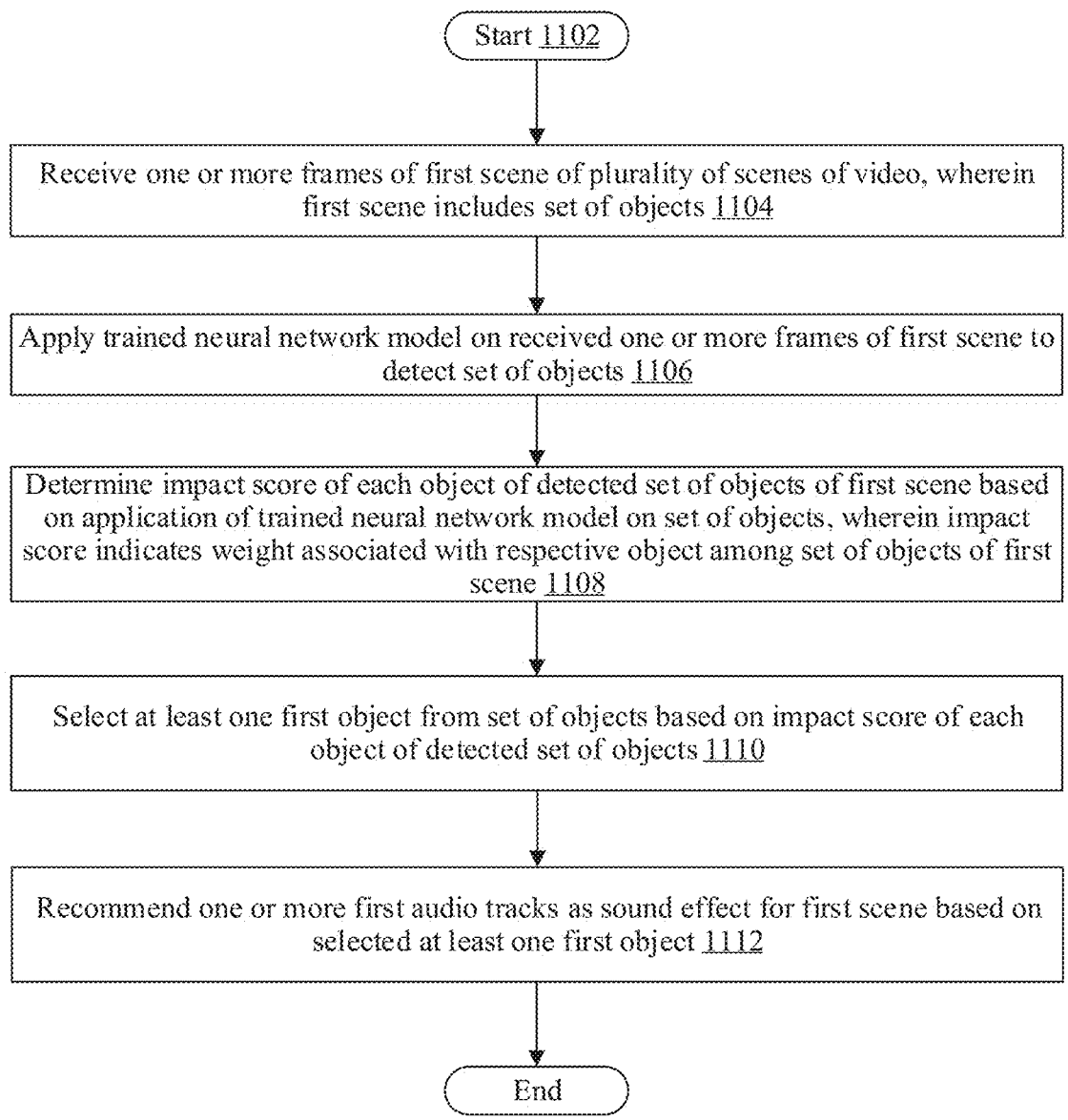
FIG. 11 is a flowchart that illustrates exemplary operations for recommendation of audio based on video analysis, in accordance with an embodiment of the disclosure.

FIG. 11 is a flowchart that illustrates exemplary operations for recommendation of audio based on video analysis, in accordance with an embodiment of the disclosure. FIG. 11 is explained in conjunction with elements from FIGS. 1-10. With reference to FIG. 11, there is shown a flowchart 1100. The operations from 1102 to 1112 may be implemented on any computing device, for example, the electronic device 102 or the circuitry 202. The operations may start at 1102 and proceed to 1104.

At 1104, the one or more frames 116 of the first scene 114A of the plurality of scenes 114 of the video 112 may be received, wherein the first scene 114A may include the set of objects 118. In one or more embodiments, the circuitry 202 may be configured to the receive the one or more frames 116 of the first scene 114A of the plurality of scenes 114 of the video 112. The first scene 114A may include the set of objects 118.

At 1106, the trained neural network (NN) model 104 may be applied on the received one or more frames 116 of the first scene 114A to detect the set of objects 118. In one or more embodiments, the circuitry 202 may be configured to apply the trained NN model 104 on the received one or more frames 116 of the first scene 114A to detect the set of objects 118.

At 1108, the impact score of each object of the detected set of objects 118 may be determined based on the application of the trained NN model 104 on the set of objects 118, wherein the impact score may indicate a weight associated with a respective object among the set of objects 118 of the first scene 114A. In one or more embodiments, the circuitry 202 may be configured to determine the impact score of each object of the detected set of objects 118 of the first scene 114A based on the application of the trained NN model 104 on the set of objects 118. The impact score may indicate a weight associated with a respective object among the set of objects 118 of the first scene 114A.

At 1110, at least one first object 118A from the set of objects 118 may be selected based on the impact score of each object of the detected set of objects 118. In one or more embodiments, the circuitry 202 may be configured to select at least one first object 118A from the set of objects 118 based on the impact score of each object of the detected set of objects 118.

At 1112, the one or more first audio tracks may be recommended as a sound effect for the first scene based on the selected at least one first object 118A. In one or more embodiments, the circuitry 202 may be configured to recommend the one or more first audio tracks as the sound effect for the first scene 114A based on the selected at least one first object 118A. Control may pass to end.

Various embodiments of the disclosure may provide a non-transitory computer-readable medium and/or storage medium having stored thereon, instructions executable by a machine and/or a computer such as the electronic device 102 or the circuitry 202. The instructions may cause the machine and/or computer to perform operations that may include reception one or more frames of a first scene of a plurality of scenes of a video. The first scene may include a set of objects. The operations may include application of a trained neural network model on the received one or more frames of the first scene to detect the set of objects. The operations may further include determination of an impact score of each object of the detected set of objects of the first scene based on the application of the trained neural network model on the set of objects. The impact score may indicate a weight associated with a respective object among the set of objects of the first scene. The operations may further include selection of at least one first object from the set of objects based on the impact score of each object of the detected set of objects. The operations may further include recommendation of one or more first audio tracks as a sound effect for the first scene based on the selected at least one first object.

Exemplary aspects of the disclosure may include an electronic device (such as the electronic device 102 of FIG. 1) that may include circuitry (such as the circuitry 202). The circuitry 202 may be configured to receive one or more frames (such as the one or more frames 116) of a first scene (such as the first scene 114A) of a plurality of scenes (such as the plurality of scenes 114) of a video (such as the video 112). The first scene 114A may include a set of objects (such as the set of objects 118). The set of objects 118 may include a first object 118A and a second object 118B. The circuitry 202 may be further configured to apply a trained neural network (NN) model (such as the trained NN model 104) on the received one or more frames 116 of the first scene 114A to detect the set of objects 118. The circuitry 202 may be further configured to determine an impact score of each object of the detected set of objects 118 of the first scene 114A based on the application of the trained NN model 104 on the set of objects 118. The impact score may indicate a weight associated with a respective object among the set of objects 118 of the first scene 114A. The circuitry 202 may be further configured to select at least one first object (such as the first object 118A) from the set of objects 118 based on the impact score of each object of the detected set of objects 118. The circuitry 202 may be further configured to recommend one or more first audio tracks as a sound effect for the first scene 114A based on the selected at least one first object 118A. The recommended one or more first audio tracks may include at least one of Foley sounds, ambient sounds, or background music from an audio database.

In accordance with an embodiment, the circuitry 202 may be further configured to select at least one audio track from the recommended one or more first audio tracks. The circuitry 202 may be further configured to add the selected at least one audio track as the sound effect to an original audio track of the first scene 114A. The original audio track may include audio representation of one or more dialogues spoken by one or more objects of the set of objects 118.

In accordance with an embodiment, the circuitry 202 may be configured to generate a computer-generated object script (such as computer-generated object script 500) based on a plurality of impact scores for each scene of the plurality of scenes 114. Each impact score of the plurality of impact scores may correspond to the respective object of the set of objects 118. The computer-generated object script 500 may include a time duration of an appearance of each object of the set of objects 118 in the video 112, a type of the respective object, and the impact score of the respective object in the time duration. The circuitry 202 may be further configured to recommend the one or more first audio tracks for the first scene 114A based on a highest impact score of the at least one first object 118A among the plurality of impact scores.

In accordance with an embodiment, the circuitry 202 may be configured to receive an original script (such as the original script 404) from a user device (such as the user device B 1004B). The plurality of scenes 114 of the video 112 may be captured based on the original script 404. The circuitry 202 may be further configured to compare the received original script 404 and the computer-generated object script 500. The circuitry 202 may recommend one or more second audio tracks as the sound effect for the first scene 114A based on the comparison.

In accordance with an embodiment, the circuitry 202 may be configured to determine an emotional quotient associated with a second scene (such as the second scene 114B) of the plurality of scenes 114 based on of one the computer-generated object script 500 or textual data related to the second scene 114B. The circuitry 202 may be further configured to recommend one or more third audio tracks as the sound effect for the second scene 114B based on the emotional quotient.

In accordance with an embodiment, the circuitry 202 may be configured to determine genre information associated with the first scene 114A based on an original audio of the first scene 114A and an emotional quotient associated with the first scene 114A. The circuitry 202 further determine a direction of the original audio in the first scene 114A based on a perspective of a viewer (such as the viewer 702) of the video 112. The circuitry 202 may be further configured to recommend the one or more first audio tracks based on the determined genre information and the determined direction of the original audio.

In accordance with an embodiment, the circuitry 202 may be further configured to determine a set of key points (such as the set of key points 606) associated with a posture of the at least one first object (such as the first object 604) of the set of objects 118. The circuitry 202 may be further configured to determine a first set of coordinate values associated with the set of key points 606 at a first timestamp and a second set of coordinate values associated with the set of key points 606 at a second timestamp. The circuitry 202 may be further configured to compute a first difference between the determined first set of coordinate values and the determined second set of coordinate values and a second difference between the first timestamp and the second timestamp. The circuitry 202 may further detect a motion of the first object 604 based on the determined first set of coordinate values and the determined second set of coordinate values. The circuitry 202 may be further configured to estimate a speed of the detected motion of the first object 604 based on the computed first difference and the computed second difference. The circuitry 202 may be further configured to recommend the one or more second audio tracks as the sound effect for the first scene 114A based on the estimated speed.

In accordance with an embodiment, the circuitry 202 may be configured to receive a user input to equalize the one or more first audio tracks. The circuitry 202 may be further configured to equalize the one or more first audio tracks based on the received user input. The circuitry 202 may be further configured to store the equalized one or more first audio tracks in an audio database (such as the audio database 106) for the recommendation.

In accordance with an embodiment, the circuitry 202 may be further configured to receive a plurality of audio tracks from a user device. The circuitry 202 may be further configured to classify the plurality of audio tracks into one or more categories based on a set of parameters associated with a corresponding audio track of the plurality of audio tracks, and may store the classified plurality of audio tracks in an audio database. The classified plurality of audio tracks may include the one or more first audio tracks. The set of parameters may include at least of a mel-frequency cepstral coefficient (MFCC) parameter, a zero-crossing rate parameter, a spectral-roll off parameter, a spectral bandwidth, a spectral flux parameter, a spectral entropy parameter, a chroma vector parameter, a chroma deviation parameter, an energy parameter, or a pitch parameter.

In accordance with an embodiment, the circuitry 202 may be configured to train a neural network model on one or more features related to the set of objects to obtain the trained NN model 104. The neural network model may be trained for the detection of the set of objects 118, the determination of the impact score of each object of the set of objects 118, and the classification of the one or more first audio tracks.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
    circuitry configured to:
        receive at least one frame of a first scene of a plurality of scenes of a video, wherein the first scene comprises a set of objects;
        apply a trained neural network model on the received at least one frame of the first scene to detect the set of objects;
        determine an impact score of each object of the detected set of objects of the first scene based on the application of the trained neural network model on the set of objects, wherein the impact score indicates a weight associated with a respective object among the set of objects of the first scene;
        generate a computer-generated object script based on a plurality of impact scores for each scene of the plurality of scenes, wherein
            each impact score of the plurality of impact scores corresponds to the respective object of the set of objects, and
            the computer-generated object script comprises a time duration of an appearance of each object of the set of objects in the video, a type of the respective object, and the impact score of the respective object in the time duration;
        select at least one first object from the set of objects based on the impact score of each object of the detected set of objects; and
        recommend at least one first audio track as a sound effect for the first scene based on a highest impact score of the at least one first object among the plurality of impact scores.

2. The electronic device according to claim 1, wherein
    the circuitry is further configured to add the recommended at least one first audio track as the sound effect for the first scene, and
    the recommended at least one first audio track comprise Foley sounds, ambient sounds, and background music from an audio database.

3. The electronic device according to claim 1, wherein the circuitry is further configured to:
    select at least one audio track from the recommended at least one first audio track; and
    add the selected at least one audio track as the sound effect to an original audio track of the first scene, wherein the original audio track comprises audio representation of at least one dialogue spoken by at least one object of the set of objects.

4. The electronic device according to claim 1, wherein the circuitry is further configured to:
   determine a set of key points associated with a posture of the at least one first object of the set of objects;
   determine a first set of coordinate values associated with the set of key points at a first timestamp;
   determine a second set of coordinate values associated with the set of key points at a second timestamp;
   detect a motion of the at least one first object based on the determined first set of coordinate values and the determined second set of coordinate values; and
   recommend at least one second audio track as the sound effect for the first scene based on the detected motion of the at least one first object.

5. The electronic device according to claim 4, wherein the circuitry is further configured to:
   compute a first difference between the determined first set of coordinate values and the determined second set of coordinate values;
   compute a second difference between the first timestamp and the second timestamp;
   estimate a speed of the detected motion of the at least one first object based on the computed first difference and the computed second difference; and
   recommend the at least one second audio track as the sound effect for the first scene based on the estimated speed.

6. The electronic device according to claim 1, wherein the circuitry is further configured to:
   generate a computer-generated object script based on a plurality of impact scores for each scene of the plurality of scenes;
   receive an original script from a user device, wherein the plurality of scenes of the video is captured based on the original script;
   compare the received original script and the computer-generated object script; and
   recommend at least one second audio track as the sound effect for the first scene based on the comparison.

7. The electronic device according to claim 1, wherein the circuitry is further configured to:
   generate a computer-generated object script based on a plurality of impact scores for each scene of the plurality of scenes;
   determine an emotional quotient associated with a second scene of the plurality of scenes based on one of the computer-generated object script or textual data related to the second scene; and
   recommend at least one third audio track as the sound effect for the second scene based on the emotional quotient.

8. The electronic device according to claim 1, wherein the circuitry is further configured to:
   determine genre information associated with the first scene based on an original audio of the first scene and an emotional quotient associated with the first scene;
   determine a direction of the original audio in the first scene based on a perspective of a viewer of the video; and
   recommend the at least one first audio track based on the determined genre information and the determined direction of the original audio.

9. The electronic device according to claim 1, wherein the circuitry is further configured to:
   receive a user input to equalize the at least one first audio track;
   equalize the at least one first audio track based on the received user input; and
   store the equalized at least one first audio tracks in an audio database for the recommendation.

10. The electronic device according to claim 1, wherein the set of objects comprises the at least one first object visible in a foreground of the first scene from a perspective of a viewer of the video, and a second object in a background of the first scene from the perspective of the viewer.

11. The electronic device according to claim 1, wherein the circuitry is further configured to:
    receive a plurality of audio tracks from a user device;
    classify the plurality of audio tracks into at least one category based on a set of parameters associated with a corresponding audio track of the plurality of audio tracks; and
    store the classified plurality of audio tracks in an audio database, wherein the classified plurality of audio tracks comprises the at least one first audio track.

12. The electronic device according to claim 11, wherein the set of parameters comprises at least one of a mel-frequency cepstral coefficient (MFCC) parameter, a zero-crossing rate parameter, a spectral-roll off parameter, a spectral bandwidth, a spectral flux parameter, a spectral entropy parameter, a chroma vector parameter, a chroma deviation parameter, an energy parameter, or a pitch parameter.

13. The electronic device according to claim 1, wherein the circuitry is further configured to train a neural network model on at least one feature related to the set of objects to obtain the trained neural network model, and
    the neural network model is trained for the detection of the set of objects, the determination of the impact score of each object of the set of objects, and a classification of the at least one first audio track.

14. A method, comprising:
    receiving at least one frame of a first scene of a plurality of scenes of a video, wherein the first scene comprises a set of objects;
    applying a trained neural network model on the received at least one frame of the first scene to detect the set of objects;
    determining an impact score of each object of the detected set of objects of the first scene based on the application of the trained neural network model on the set of objects, wherein the impact score indicates a weight associated with a respective object among the set of objects of the first scene;
    generating a computer-generated object script based on a plurality of impact scores for each scene of the plurality of scenes, wherein
      each impact score of the plurality of impact scores corresponds to the respective object of the set of objects, and
      the computer-generated object script comprises a time duration of an appearance of each object of the set of objects in the video, a type of the respective object, and the impact score of the respective object in the time duration;
    selecting at least one first object from the set of objects based on the impact score of each object of the detected set of objects; and
    recommending at least one first audio track as a sound effect for the first scene based on a highest impact score of the at least one first object among the plurality of impact scores.

15. The method according to claim 14, further comprising:
selecting at least one audio track from the recommended at least one first audio tracks; and
adding the selected at least one audio track as the sound effect to an original audio track of the first scene, wherein the original audio track comprises audio representation of at least one dialogue spoken by at least one object of the set of objects.

16. The method according to claim 14, further comprising:
determining a set of key points associated with a posture of the at least one first object of the set of objects;
determining a first set of coordinate values associated with the set of key points at a first timestamp;
determining a second set of coordinate values associated with the set of key points at a second timestamp;
detecting a motion of the at least one first object based on the determined first set of coordinate values and the determined second set of coordinate values; and
recommending at least one second audio track as the sound effect for the first scene based on the detected motion of the at least one first object.

17. The method according to claim 16, further comprising:
generating a computer-generated object script based on a plurality of impact scores for each scene of the plurality of scenes;
determining an emotional quotient associated with a second scene of the plurality of scenes based on one of the computer-generated object script or textual data related to the second scene; and
recommending at least one third audio track as the sound effect for the second scene based on the emotional quotient.

18. A non-transitory computer-readable medium having stored thereon, computer-executable instructions which, when executed by an electronic device, cause the electronic device to execute operations, the operations comprising:
receiving at least one frame of a first scene of a plurality of scenes of a video, wherein the first scene comprises a set of objects;
applying a trained neural network model on the received at least one frame of the first scene to detect the set of objects;
determining an impact score of each object of the detected set of objects of the first scene based on the application of the trained neural network model on the set of objects, wherein the impact score indicates a weight associated with a respective object among the set of objects of the first scene;
generating a computer-generated object script based on a plurality of impact scores for each scene of the plurality of scenes, wherein
each impact score of the plurality of impact scores corresponds to the respective object of the set of objects, and
the computer-generated object script comprises a time duration of an appearance of each object of the set of objects in the video, a type of the respective object, and the impact score of the respective object in the time duration;
selecting at least one first object from the set of objects based on the impact score of each object of the detected set of objects; and
recommending at least one first audio track as a sound effect for the first scene based on a highest impact score of the at least one first object among the plurality of impact scores.

* * * * *